United States Patent
Bianco et al.

(10) Patent No.: US 9,902,276 B2
(45) Date of Patent: Feb. 27, 2018

(54) OVERHEAD ELECTRIC VEHICLE CHARGING SYSTEM

(75) Inventors: James S. Bianco, Suffield, CT (US); John Fahy, Longmeadow, MA (US)

(73) Assignee: Control Module, Inc., Enfield, CT (US)

( * ) Notice: Subject to any disclaimer, the term of this patent is extended or adjusted under 35 U.S.C. 154(b) by 1034 days.

(21) Appl. No.: 12/889,756

(22) Filed: Sep. 24, 2010

(65) Prior Publication Data
US 2011/0074351 A1    Mar. 31, 2011

Related U.S. Application Data

(60) Provisional application No. 61/277,508, filed on Sep. 25, 2009, provisional application No. 61/278,807, (Continued)

(51) Int. Cl.
*H02J 7/00* (2006.01)
*B60L 11/18* (2006.01)
(Continued)

(52) U.S. Cl.
CPC ....... *B60L 11/1816* (2013.01); *B60L 11/1824* (2013.01); *B60L 11/1825* (2013.01); *E04H 6/025* (2013.01); *G07F 15/005* (2013.01); *B60L 2230/12* (2013.01); *B60L 2230/16* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/16* (2013.01); *Y02T 90/163* (2013.01)

(58) Field of Classification Search
CPC ............................ Y02T 90/121; Y02T 90/122

USPC ......... 320/109, 107; 307/9.1, 10.1; 191/2, 4; 414/281
See application file for complete search history.

(56) References Cited

U.S. PATENT DOCUMENTS 2,323,585 A    7/1943 Deuring
2,754,934 A *  7/1956 Wallace et al. ............... 187/213
(Continued)

FOREIGN PATENT DOCUMENTS

SU    431346 A * 11/1974

OTHER PUBLICATIONS

Sae International, Sae Standard on EV Charging Connector Approved, Jan. 15, 2010.*

*Primary Examiner* — Drew A Dunn
*Assistant Examiner* — Michael DiBenedetto
(74) *Attorney, Agent, or Firm* — Alix, Yale & Ristas, LLP

(57) ABSTRACT

An electric charging system for charging electric vehicles is particularly adapted for use in a parking garage. Parking spaces in the garage are fixed with a charging station so that the vehicles may be charged while they park at the garage. The power cable which connects to charge the vehicle battery is suspended at a height generally above the vehicle and is automatically retractable. Information concerning the power charge is automatically transmitted to the payment station at the exit gate. A point of sale (POS) module is mounted for communication with the power cable. The point of sale (POS) module and the connector are easily accessible and the connector is positionable for ease of connection with the vehicle terminal. A retractor for extending and retracting an overhead power cable employs a drive wheel and a clutch which are electronically controlled.

9 Claims, 38 Drawing Sheets

Related U.S. Application Data filed on Oct. 13, 2009, provisional application No. 61/372,232, filed on Aug. 10, 2010.

(51) Int. Cl.
*G07F 15/00* (2006.01)
*E04H 6/02* (2006.01)

(56) References Cited

U.S. PATENT DOCUMENTS

| | | | |
|---|---|---|---|
| 2,984,714 A | 5/1961 | Kunkle | |
| 3,588,388 A | 6/1971 | Harris | |
| 3,773,219 A * | 11/1973 | Irie | B67D 7/303 |
| | | | 222/14 |
| 3,775,593 A * | 11/1973 | Gieringer | G07B 15/04 |
| | | | 194/902 |
| 4,347,472 A | 8/1982 | Lemelson | |
| 4,359,074 A * | 11/1982 | Maruyama | B67D 7/48 |
| | | | 141/206 |
| 4,532,418 A * | 7/1985 | Meese | B60L 11/1816 |
| | | | 194/904 |
| D296,133 S * | 6/1988 | Baffo | D25/56 |
| 5,261,435 A * | 11/1993 | Stanley et al. | 135/90 |
| 5,323,099 A * | 6/1994 | Bruni | B60L 11/182 |
| | | | 320/108 |
| 5,344,331 A | 9/1994 | Hoffman et al. | |
| 5,406,327 A * | 4/1995 | Guarnotta | 348/143 |
| 5,489,773 A * | 2/1996 | Kumar | 235/380 |
| 5,548,200 A | 8/1996 | Nor et al. | |
| 5,847,537 A * | 12/1998 | Parmley, Sr. | 320/109 |
| 5,859,779 A * | 1/1999 | Giordano | G06Q 20/341 |
| | | | 700/231 |
| 5,954,102 A * | 9/1999 | Sato | B67D 7/228 |
| | | | 141/392 |
| 6,338,450 B1 | 1/2002 | Schwendinger | |
| 6,498,454 B1 | 12/2002 | Pinlam et al. | |
| 7,162,454 B1 * | 1/2007 | Donner | G06Q 10/02 |
| | | | 235/382 |
| 7,811,159 B2 * | 10/2010 | Wilson et al. | 454/119 |
| 8,013,569 B2 * | 9/2011 | Hartman | B60L 11/1822 |
| | | | 180/165 |
| 8,054,039 B2 * | 11/2011 | Bauerle | B60L 3/003 |
| | | | 320/109 |
| 2002/0160654 A1 * | 10/2002 | Kwoka | 439/505 |
| 2002/0180226 A1 * | 12/2002 | Moreth | 294/8 |
| 2004/0002243 A1 * | 1/2004 | Mellott | H01R 13/2421 |
| | | | 439/180 |
| 2008/0041962 A1 | 2/2008 | Wilz, Sr. et al. | |
| 2009/0174365 A1 | 7/2009 | Lowenthal et al. | |
| 2010/0017249 A1 | 1/2010 | Fincham et al. | |
| 2010/0060016 A1 * | 3/2010 | Hunter | 290/1 R |
| 2010/0102775 A1 * | 4/2010 | Chander et al. | 320/109 |
| 2010/0121588 A1 | 5/2010 | Elder et al. | |
| 2010/0241542 A1 | 9/2010 | Pinkusevich et al. | |

\* cited by examiner

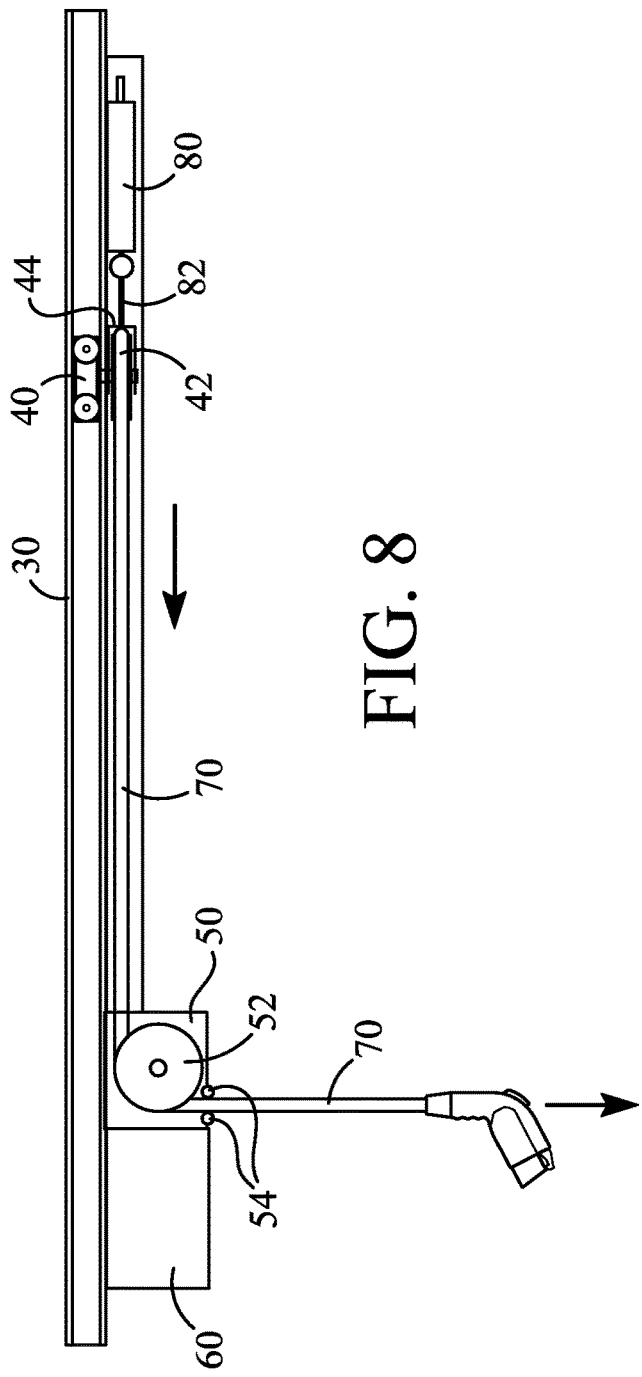
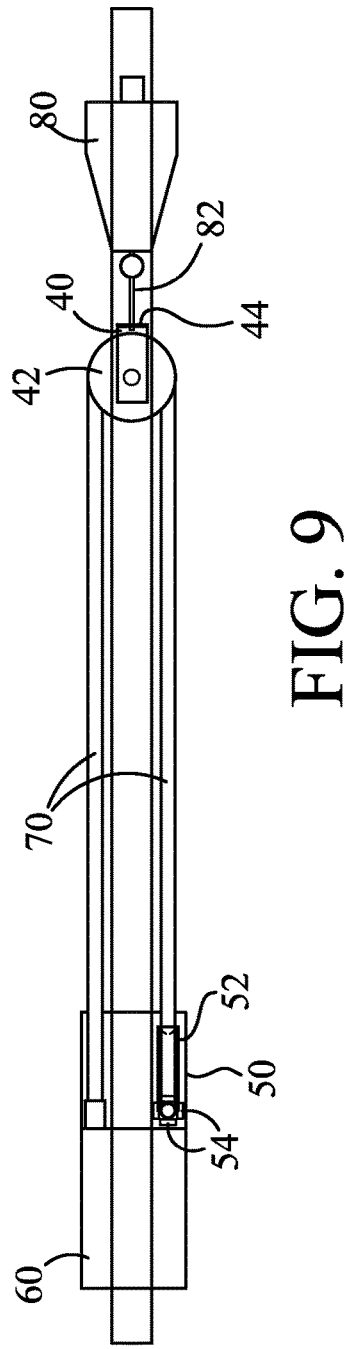
FIG. 8
FIG. 9

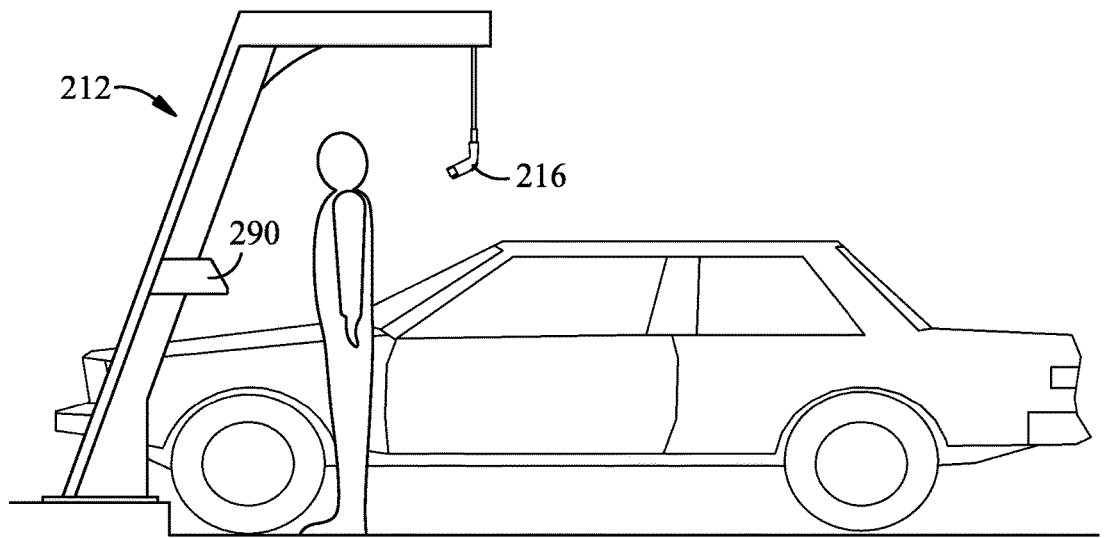
FIG. 18
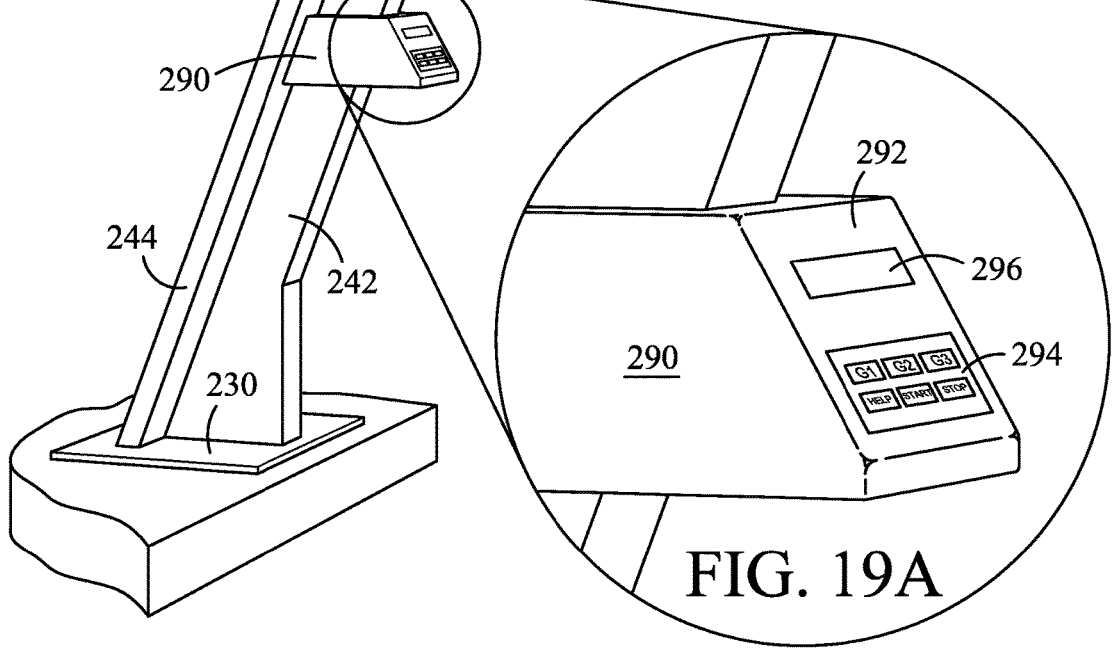
FIG. 19
FIG. 19A

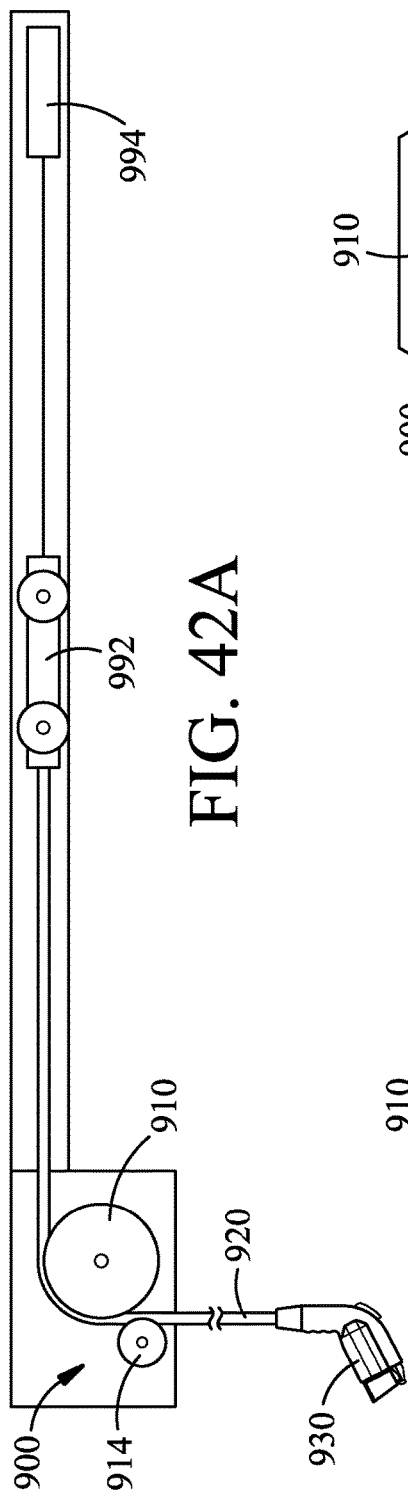
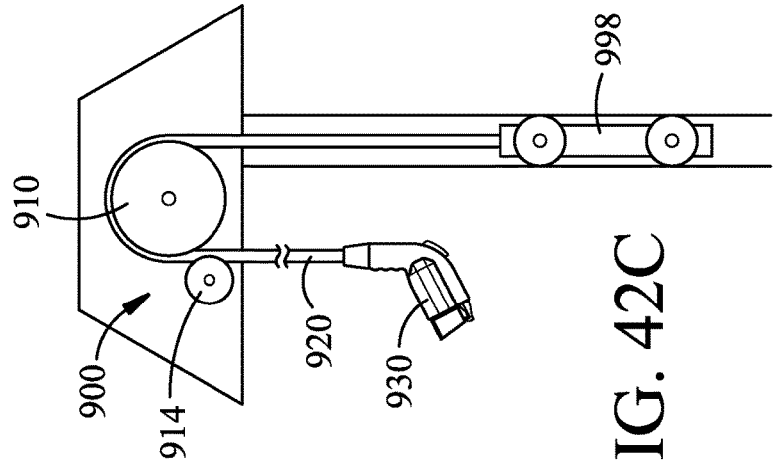
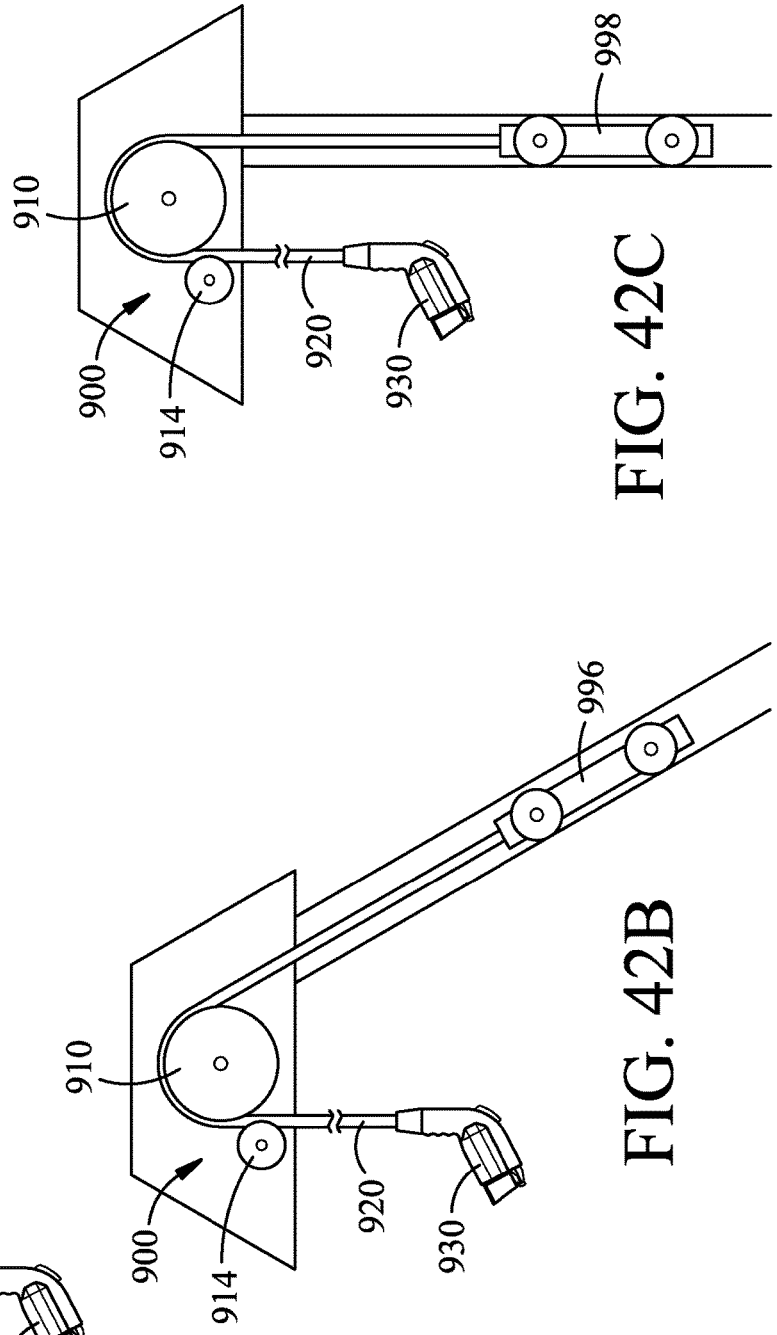
FIG. 42A
FIG. 42C
FIG. 42B

OVERHEAD ELECTRIC VEHICLE CHARGING SYSTEM

CROSS-REFERENCE TO RELATED APPLICATION

This application claims the priority of U.S. Provisional Application No. 61/277,508 filed Sep. 25, 2009, U.S. Provisional Application No. 61/278,807 filed Oct. 13, 2009 and U.S. Provisional Application No. 61/372,232 filed Aug. 10, 2010, the entirety of which applications are incorporated herein by reference.

BACKGROUND

This disclosure relates generally to installations which are adapted to charge batteries of electric vehicles. More particularly, this disclosure relates to electric charging station installations which are accessible to the public for charging a battery of an electric vehicle.

Numerous installations have been proposed for supplying electric power to charge the battery of an electric vehicle. Such installations may employ wall, pole or pedestal-type structures having a power cable with a terminal which connects with the charging terminal of the electric vehicle.

For installations which are adapted for use by the public, a number of problems are presented. First, it is necessary to provide a system for obtaining and limiting access to the power supply. Second, there are safety factors associated with supplying power—especially 220 volt/high amperage power to a battery. Third, there are issues concerning the conditions and method of payment for the consumed power. There are also additional problems associated with improper usage of the installation equipment or electric vehicles accidentally leaving the site with the cable connected to the vehicle power supply. Additional deficiencies of some prior installations involve the lack of efficient and user-friendly operation of the charging installation.

In parking garages which may house numerous vehicles, a number of proposals have been made to configure at least some of the parking spaces with installations to charge an electric vehicle while it is parked in the garage. The placement and access of the power cable and the ensuring of proper usage by the vehicle operator are important considerations. In addition, there are issues as to how, if at all, the usage of the power is to be charged and paid for by the vehicle owner.

A high usage parking garage or parking facility presents other unique challenges. It is highly disadvantageous if the cables, in particular, the terminal connectors, are left on the garage deck or pavement where they can be easily obscured and/or damaged by vehicles. In addition, because electric vehicles may have electric terminal points at various vehicle locations depending on the vehicle, it is desirable to provide an electric connection which easily accommodates all the various possible connection points and yet provides a placement of the cable/connector in an advantageous and prominent position when the power cable is not in use.

SUMMARY

Briefly stated, a system for charging an electric vehicle is especially adaptable for use in a parking garage. A station for the charging system in one embodiment employs a rail disposed at a height generally above a vehicle to be charged. A trolley is moveable along the rail, and the trolley mounts a moveable pulley. A fixed pulley is mounted at a fixed position relative to the rail. A power cable communicates at one end with a power module and at an opposed second end with a vehicle terminal connector. The cable loops around the moveable and fixed pulleys so that the connector is suspended below the rail. A spring return device connects with the moveable pulley to urge the pulley to a retracted position.

A pull cord may be attached to the power cable. A point of sale (POS) module is positioned adjacent the connector. The POS module is connected to break away from the connector. The POS module has a reader and also may incorporate a level 1 vehicle outlet connector. The POS module further preferably comprises a plurality of switches for selectively implementing a charging parameter from several possible power charge parameters. A vehicle detector may also be employed. A transceiver preferably communicates data indicative of the power charge to a payment interface unit.

In one preferred application, a parking garage comprises a multiplicity of parking spaces disposed on a deck with a plurality of spaces having an electric vehicle charging station. An entrance gate is controlled by a ticket dispenser or a reader. An exit gate is controlled by a payment station. The electric charging station has a retractable power cord and a control module positioned above the deck. The power cord communicates with the power source and a POS module and a connector adapted to connect with the electric vehicle charging terminal. For usage, the connector is connected to the vehicle terminal. Power is accessed via the POS module, and the electric vehicle battery is charged. Information concerning the amount of power used and the identity of the vehicle for the charging function is transmitted from the control module to the payment station.

The POS module preferably includes a reader. A ticket issued by the ticket dispenser is read by the reader to access power. In one garage application, a plurality of exit gates are each controlled by a payment station. The control module transmits information concerning the charging of the vehicle and the vehicle identity to each of the payment stations. The connector connects with the POS module in a breakaway-type connection. The POS module preferably includes a plurality of buttons for selecting various power parameters for charging the vehicle battery.

Each charging station employs a ground fault detection for preventing the delivery of power upon detection of a ground fault. The charging installation preferably includes a level 1 vehicle terminal connector and a level 2 vehicle terminal connector. The cost incurred for charging the electric vehicle is automatically added to the parking charge at the payment station. The POS module may further comprise a button which is activatable for summoning help at the charging station. Upon disconnecting the connector from the vehicle terminal and releasing the connector, the power cord automatically retracts to a height suspended generally above the vehicle and is readily accessible for usage.

A facility for charging an electric vehicle in another embodiment comprises a plurality of stanchion units. Each of the stanchion units comprises an upright support and a projecting member extending from the support in an elevated position. A retractable power cable has a terminal for connecting with the power charge terminal of the battery system and electric vehicle. The cable terminal is suspended from the projecting member. A control module is mounted to the support. The control module provides an input interface for controlling access to the power supply to the cable. A canopy is mounted above and supported by the stanchion units. Upon disconnection from the power charge terminal of the vehicle, the cable is automatically urged to an overhead location.

An overhead retractor system, which may be electronically controlled, functions to retract, extend and release the power cable for use in charging an electric vehicle. The retractor system employs a power cable with an electrical connector for an electric vehicle. The retraction mechanism for the power cable is disposed in overhead relationship. The retraction mechanism comprises a motor, a drive wheel and a clutch interposed between the motor and drive wheel to provide an engaged first position wherein the motor drives the drive wheel in an unengaged second position wherein the drive wheel is in a rotatable free state. When the motor is activated and the clutch is in the first position, the cable is extendably lowered. When the drive wheel is driven in a first direction and the cable is retracted when the drive wheel is driven in a second direction. The cable may be manually extended when the clutch is in the second position.

The clutch is mounted to an arm for axial positioning and the axial position is governed by a solenoid. The position of the power cable is sensed by means of at least one magnetic sensor. In a retracted position, the connector is fully received within an enclosure. A portion of the cable is looped around a weight trolley. In one embodiment, a portion of the cable around a member is connected to a spring return mechanism. The return mechanism further comprises a pressure wheel in cooperative position with the drive wheel so that said pressure wheel and the drive wheel engage opposing portions of the power cable. A magnetic member is rotatably fixed with the pressure wheel and a sensor detects angular positions of the member to produce pulsing. The number of pulses is compared to a pre-established pulse number to determine whether the retraction mechanism is properly operating.

In another embodiment, the retraction mechanism comprises a pair of idlers disposed in the spaced overhead relationship. The power cable is moveable across the idlers to suspend the electrical connector. The clutch comprises an arm mounting a roller disposed above the drive wheel which is positioned between the idlers. The arm is positionable on a first position which allows the cable to be freely pulled across the idlers and a second position which forces the cable against the drive wheel. The arm is mounted for pivotal positioning and the pivotal position is governed by a solenoid.

BRIEF DESCRIPTION OF THE DRAWINGS

FIG. 8 is an enlarged side elevational view, portions removed and partly in diagram form, of a station of the vehicle charging system;

FIG. 9 is a bottom plan view, portions removed, of the vehicle charging station of FIG. 8;

FIG. 18 is a side elevational view of a stanchion unit, a vehicle and an operator prior to activating an electric power charge of the vehicle;

FIG. 19 is a perspective view of the stanchion unit of FIG. 18;

FIG. 19A is an enlarged view of the circled console portion of FIG. 19;

FIGS. 42A-42C are fragmentary interior views, partly in schematic, illustrating the retractor mechanism of FIG. 35 incorporated into a horizontal overhead, a stanchion and a vertical post electrical charging installation, respectively.

DETAILED DESCRIPTION

Figure 1:
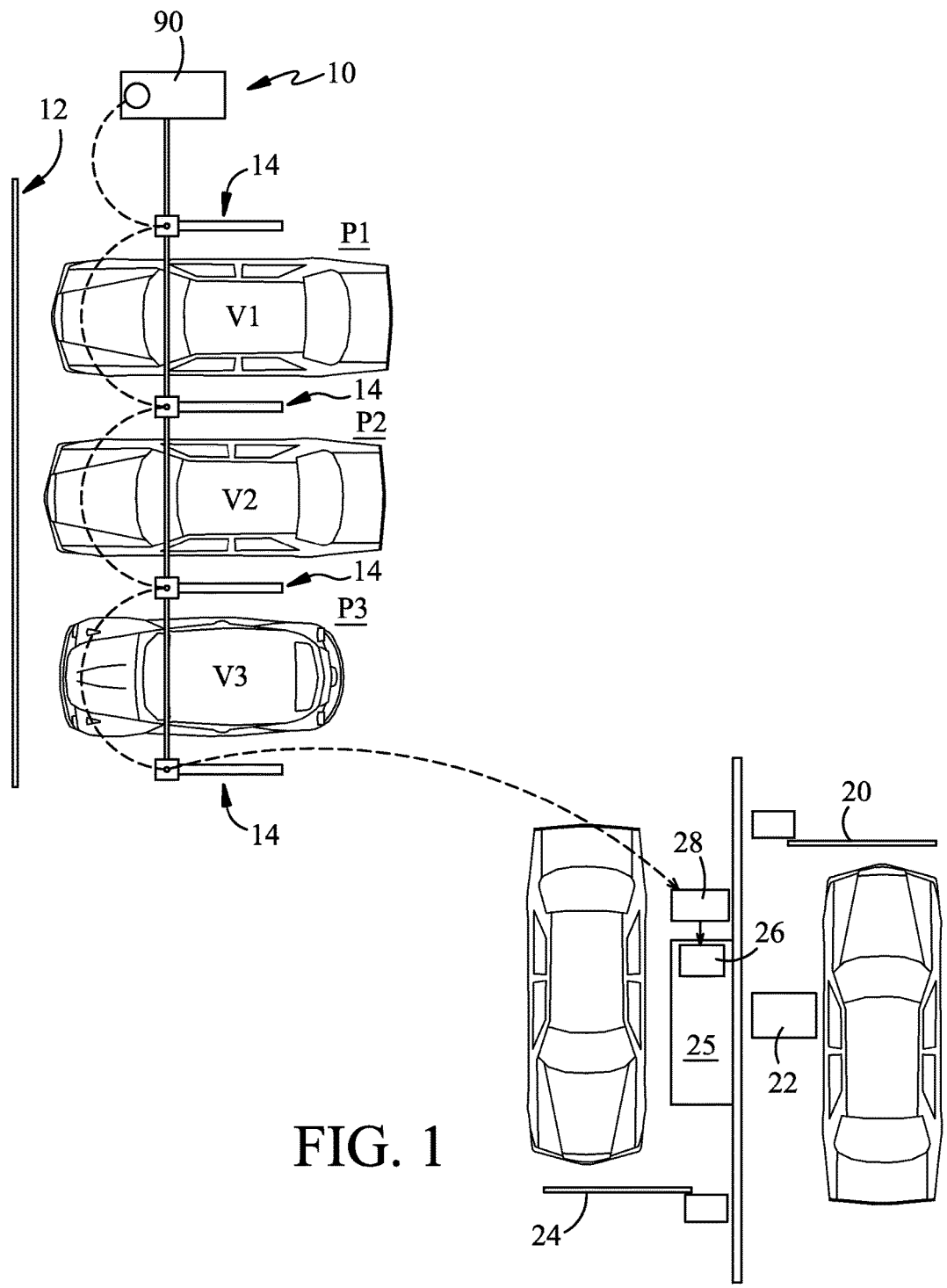
FIG. 1 is a schematic top plan view, partly in diagram form, of a representative parking garage with electric vehicles and incorporating an electric vehicle charging system.

With reference to the drawings wherein like numerals represent like parts throughout the several figures, a system for charging the battery of an electric vehicle is generally designated by the numeral 10. The system has particular applicability with a parking garage, a representative portion of which is schematically represented by the numeral 12. The garage has a number of parking spaces P1, P2, P3 . . . which have associated charging stations 14 with retractable power cables. The charging stations 14 provide an electrical power charge to the batteries of electric vehicles designated V1, V2, V3 . . . while they are parked in the garage at a charging bay.

The garage 12 preferably has an entrance gate 20 with an associated ticket dispenser 22 of conventional form and function. Upon the vehicle operator taking a ticket, the entrance gate 20 opens to allow access of the vehicle to the garage. Alternatively, access through the entrance may be obtained via an RFID tag or a proximity card or other means. The parking garage also has an exit gate 24 and an exit gate booth 25 which employs a payment system 26 and/or a card reader (not illustrated) responsive to a payment interface controller 28. Upon a manual or an automatic payment transaction, the exit gate 24 is opened to allow egress from the garage.

A rail-like track 30 which may be in the form of a steel Unistrut™ member is mounted to the ceiling of the garage or is suspended at an overhead location above the garage deck between adjacent parking spaces of the garage. With additional reference to FIGS. 8 and 9, the track 30 forms a pathway for a trolley 40. The trolley 40 mounts a movable pulley 42 and slides along the track 30 to change the linear position of the pulley. The pulley 42 rotates about a vertical axis. At an intermediate location above the parking space aisle, a bracket 50 is suspended from the track 30. The bracket 50 mounts a fixed pulley 52 at a lower position and a pair of opposed rollers 54 offset from the horizontal rotational axis of the pulley 52.

A control module 60 is disposed adjacent the bracket and provides a connection point for a power cable 70. The cable 70 loops around the movable pulley 42 and over the fixed pulley 52 and passes between the adjacent rollers 54 so that it is suspended below the ceiling in a retracted inoperative mode above the aisle between parked vehicles.

A spring return device 80, which may resemble a tool retractor or similar type mechanism, with an automatic coilable cable 82 is mounted at the underside of the track. The end of the cable 82 connects with a U-shaped bracket 44 of the movable pulley. The return device biases the movable pulley 42 and hence the trolley 40 toward a stable retracted position. Consequently, the power cable 70, which loops about the pulley 42, is also urged linearly and vertically to the retracted position.

Figure 2:
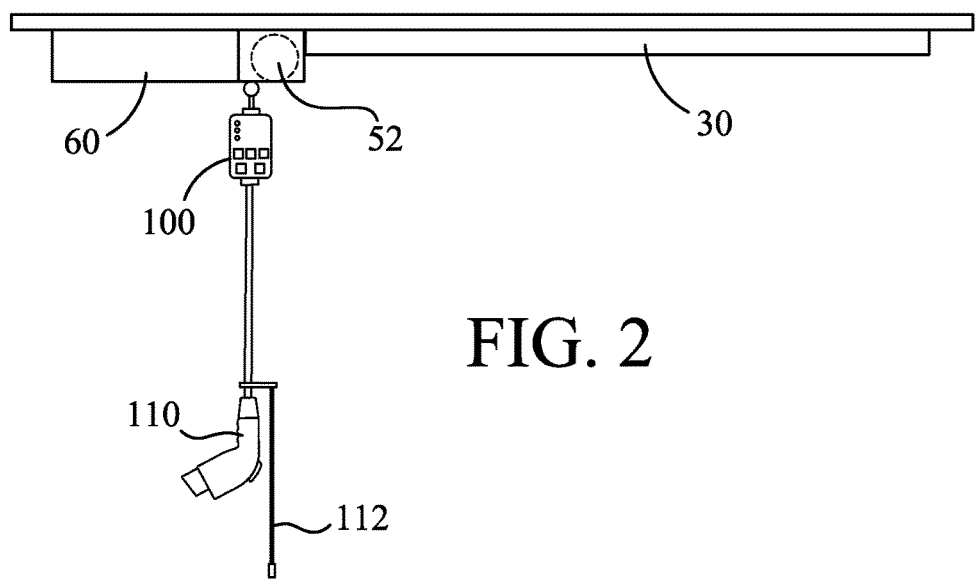
FIG. 2 is a side elevational view of a station of the vehicle charging system.
Figure 4:
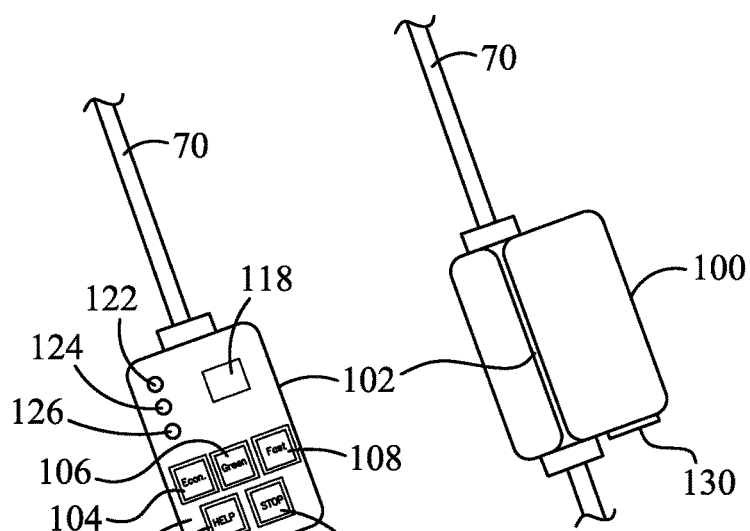
FIG. 4 is a side view of a portion of the power cable and the module of FIG. 3.
Figure 5:
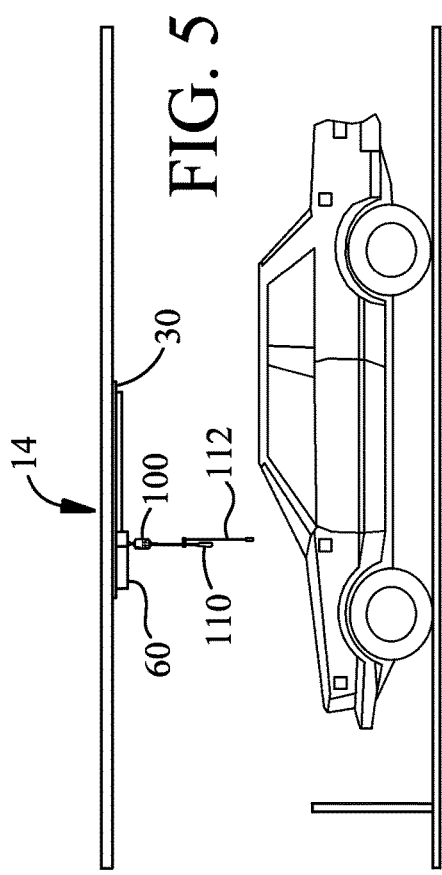
FIG. 5 is a side elevational view of an electric vehicle in a garage parking bay together with a station of the vehicle charging system.
Figure 6:
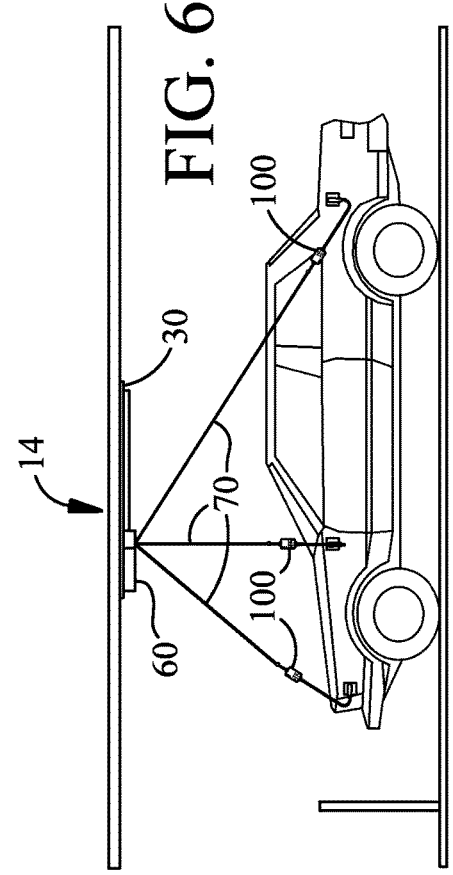
FIG. 6 is a side elevational view, partly in representative form, of the electric vehicle, the garage bay and the vehicle charging station with a power cable thereof being shown in various positions further illustrating the capability of the vehicle charging system of FIG. 5.

With additional reference to FIGS. 1 and 2, the power cable 70 connects with a control box 100 which connects in a breakaway connection with a level 2 vehicle connector 110. The vehicle connector 110 connects with the vehicle outlet terminal for supplying electric power to charge the vehicle battery. In the retracted position, the control box 100 and the connector 110 are suspended from the power cable 70 and generally positioned above the top of the vehicle. A pull cord 112 (FIGS. 2 and 5) connects with the cable adjacent the connector 110 to facilitate the vehicle operator pulling the connector and the carried control box 100 generally downwardly and into an electrically connected position with the vehicle (FIG. 6).

The spring return device 80 exerts a retracting bias on the power cable when the power cable 70 is extended to connect with the vehicle. Upon releasing the connection with the vehicle, the power cable is retracted to the non-charged position illustrated in FIG. 5. It will be appreciated that the cable may be extended to various lengths to accommodate various positions of the vehicle connecting terminal as illustrated in FIG. 6. As further illustrated in FIG. 1, a track 30 with an associated electric charging unit is preferably provided between each of the charging designated parking spaces P1, P2, P3 . . . and connected to a load center 90.

Figure 3:
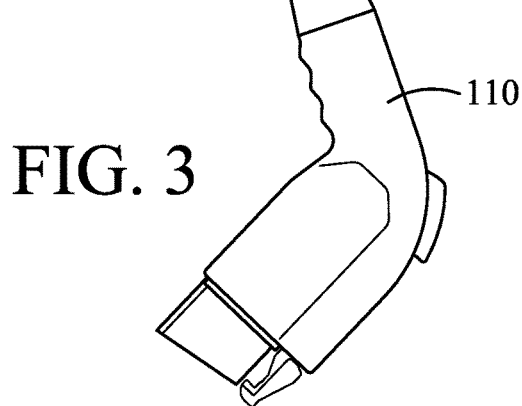
FIG. 3 is an enlarged frontal view of a portion of a power cable, a module and a connector of the vehicle charging station of FIG. 2.
Figure 7:
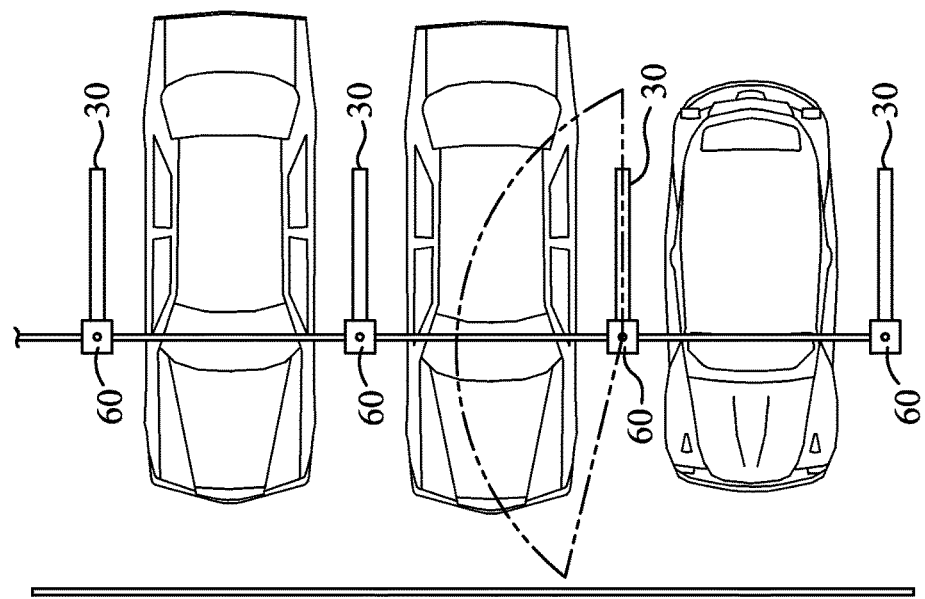
FIG. 7 is a top plan view, partly in diagram form, of associated electric vehicles in a parking garage and the vehicle charging system further illustrating the vehicle charging system.
Figure 10:
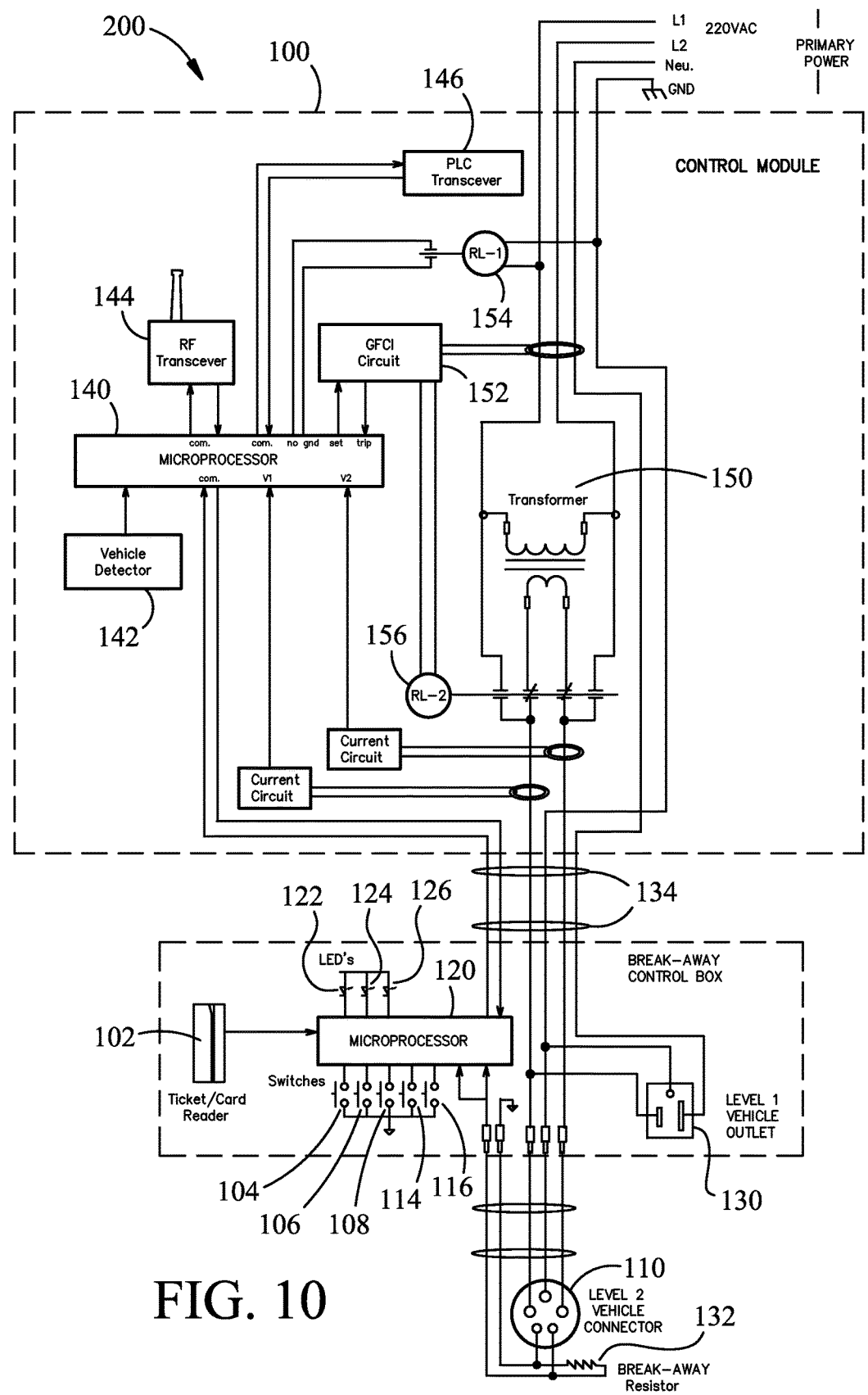
FIG. 10 is a schematic diagram for the electric vehicle charging system of FIG. 1.

With reference to FIGS. 3 and 10, the control box 100 interfaces with the operator and functions as a point of sale (POS) module. A microprocessor 120 is responsive to a ticket/card reader 102 which may take any of numerous forms, such as a magnetic strip reader, a proximity reader, an RFID reader, a chip reader or a barcode reader. In a preferred form, the operator would use the ticket that was issued upon entrance to the parking garage and swipe the ticket through the reader 102 to obtain access to power at the selected charging station 14.

The POS module 100 contains numerous switches. The switches may be activated by push buttons to select usage parameters and to provide input to the microprocessor 120, such as, for example, an economy button 104 which the user would depress to obtain the most economical energy charge, a green selection button 106 which the user would use to obtain energy from green sources, and a fast button 108 which would allow the user to obtain a charge in the fastest process available. In addition, the control box or POS module 100 preferably includes a help button 114 to immediately activate a remote help desk and a stop button 116 to allow the power charge to be terminated at any time. Preferably, a start button 118 would also be employed to start the charging of the vehicle battery.

In addition, the control box or POS module 100 includes various LED indicator lights such as, for example, a ready LED 122 which, upon illumination, indicates that the system is ready to charge, a charging LED 124 which, upon illumination, indicates that the vehicle is charging, and a help LED 126 which, upon illumination, indicates that the system is in a waiting mode pending the provision of help. Other LEDs, of course, are also possible. In addition, the control box or POS module 100 preferably also incorporates a level 1 vehicle connector 130 so that both level 1 and level 2 connections could be provided at each of the installation bays. The microprocessor 120 also communicates via the cable 70 with the control module 60.

The control module 60 also includes a microprocessor 140. A vehicle detector 142 detects the presence of a vehicle at the parking place and provides an input signal to the microprocessor 140. The control module also includes an RF transceiver 144 unit communicating with a remote interface payment controller 28 for the garage. The communication could be ZIGBEE, WI-FI, PLC or any proprietary communication format. For one embodiment, the vehicle detector 142, via the transceiver 144, is employed to ultimately transmit and post web available information to indicate that there is an available charging bay.

In a preferred form, each of the modules 60 would communicate via RF communication, such as ZIGBEE or equivalent, with each remote interface controller 28 at the exit gate booth 25. Data concerning the power usage and the user would be incorporated into the existing payment system 26 at the exit gate booth. When the vehicle exits the gate 24, the charge for the power would automatically be incorporated into the payment processing, and the vehicle operator would be presented with the bill for both the parking and the charging service.

With additional reference to FIG. 10, a block diagram for the system is generally designated by the numeral 200. The control module includes a transformer 150 that steps the primary power supply to the 220 volt level and/or 110 volt level for the level 2 connector 110 or the level 1 connector 130. A ground fault circuit 152 is employed to detect a ground fault upon connecting the connector with the vehicle. A relay circuit RL1 154 senses the ground attachment. A low voltage is applied to determine when the power cable 70 is plugged. If properly attached, the power can be turned on and the battery charging commenced.

If there is a ground fault, a relay RL2 156 terminates power to the connectors. The help button 114 may be pushed to obtain help if the power remains tripped and cannot be restored to the connector.

The breakaway control box 100 functions as a point of sale (POS) module which is easily accessible by the vehicle operator, but is retracted to a readily visible suspended position when not in use. In summary, the POS module 100 employs a microprocessor 120 which connects with the various switches, is responsive to the ticket card reader 102 and also controls illumination of the LEDs 122, 124, 126. The level 1 vehicle outlet 130 is incorporated into the breakaway control box. The connections to the connector 110 are provided by crimp-type electrical connections 134 which easily break away. A breakaway resistor 132 is employed to determine whether the connector 110 has been disengaged from the control box. The breakaway resistor 132 would thus allow detection of the breakaway condition. The power from the control module would then be terminated. Status information and data communication is provided between the microprocessor 120 of the control box and the control module microprocessor 140 which also communicates to and from the RF transceiver 146.

The vehicle charging system may be easily incorporated into an existing parking garage to provide one or more charging bays which each function to charge the battery of an electric vehicle while the electric vehicle is parked in the garage. Preferably, several charging stations 14 are provided. Moreover, the charging can be implemented and accomplished in a user-friendly and highly efficient manner so that the payment for the charging can be assessed in a seamless manner along with the payment for use of the parking facility.

In one preferred application, the operator of the electric vehicle would enter the parking facility in a conventional manner. Typically, the operator would take a ticket from the ticket dispenser 22 which would open the gate 20 for entering the parking facility. The ticket would have an ID, for example, which would include either a magnetic strip, a proximity identifier, an RFID, a chip or a barcode, etc. The operator would then park the electric vehicle in a vacant space or bay which is equipped with a charging station 14. The operator would pull down the retracted cable 70 and the point of sale (POS) module 100 by pulling down on the cord 112. The connector 110 would be connected at the appropriate location to the electric vehicle (see FIG. 6). The operator would then swipe or otherwise cause the parking ticket to be read by the reader 102 at the POS module. The operator would select the energy source and usage. The operator would then press the start button 118. The charging of the vehicle battery would then start as indicated by the charging LED.

The ticket number on the ticket and the station location would then be sent via the transceiver 146 to the interface payment controller 28 at the parking facility. Once the charge is complete, a message would be sent to the interface controller to indicate that the charging was complete. If the cable 70 were removed, a message would be sent also to the system controller or interface payment controller 28. The interface unit would then send an "end of charge" transaction to the existing payment system 26. The existing payment system 26 would then add the additional charge to the parking fee upon exiting the parking facility and presenting the ticket. The payment amount would then incorporate the assessment for charging the battery of the vehicle.

There is a two-wire communication between the control box or POS module 100 and the control module 60. The power cable 70 also functions as a communication cable. In one form, the SAE level 2 connector 110 is a 1772 connector which is rated for 220 volts and 100 amps. Typically, the level 1 connector 130 is operated at about 16 amps and a level 2 operates at about 72 amps. The power line communication can be accomplished with an X10 protocol. Other protocols may also be suitable.

Figure 11:
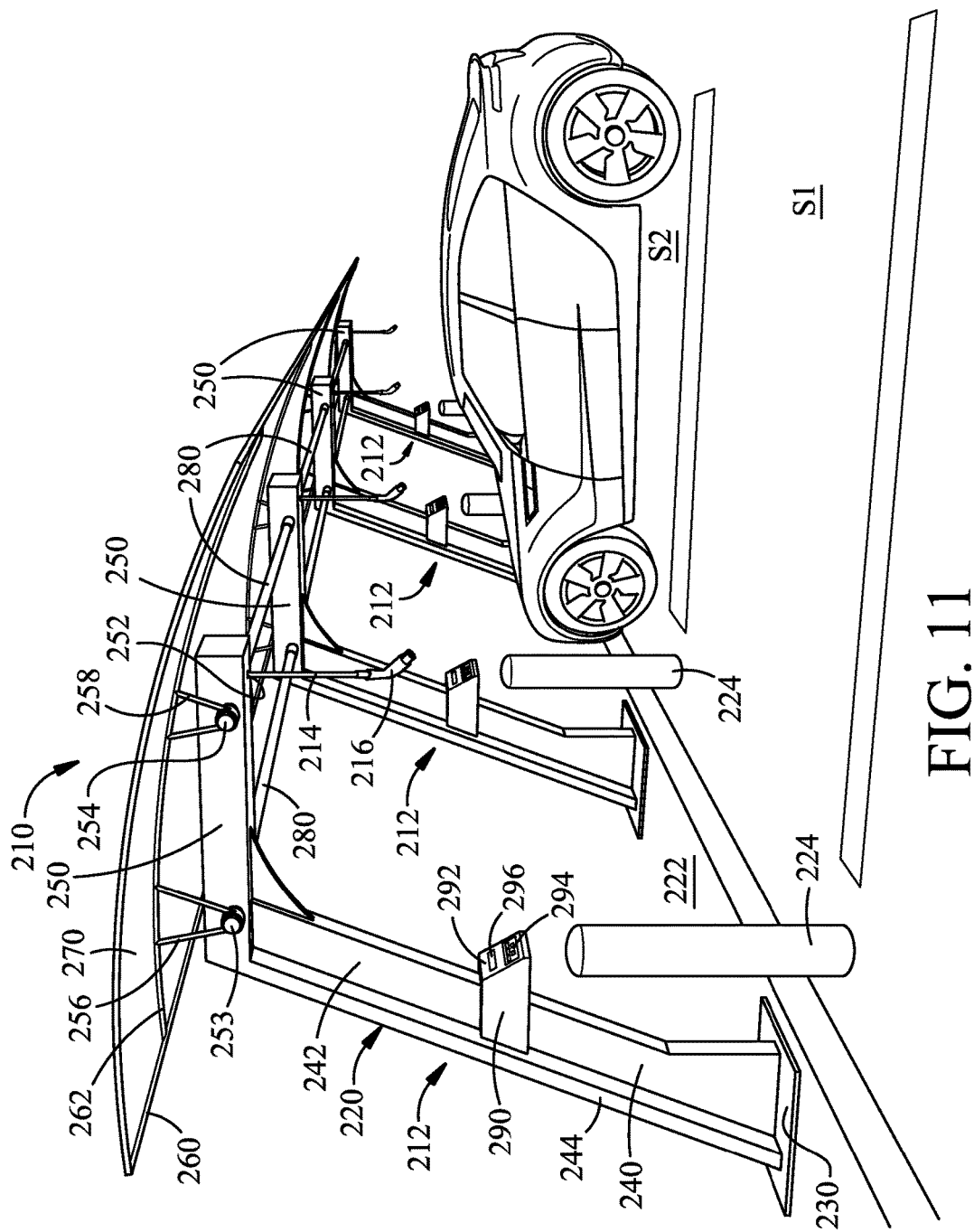
FIG. 11 is a perspective view of another embodiment of a charging facility for multiple vehicles as illustrated in conjunction with parking spaces and a representative vehicle.
Figure 12:
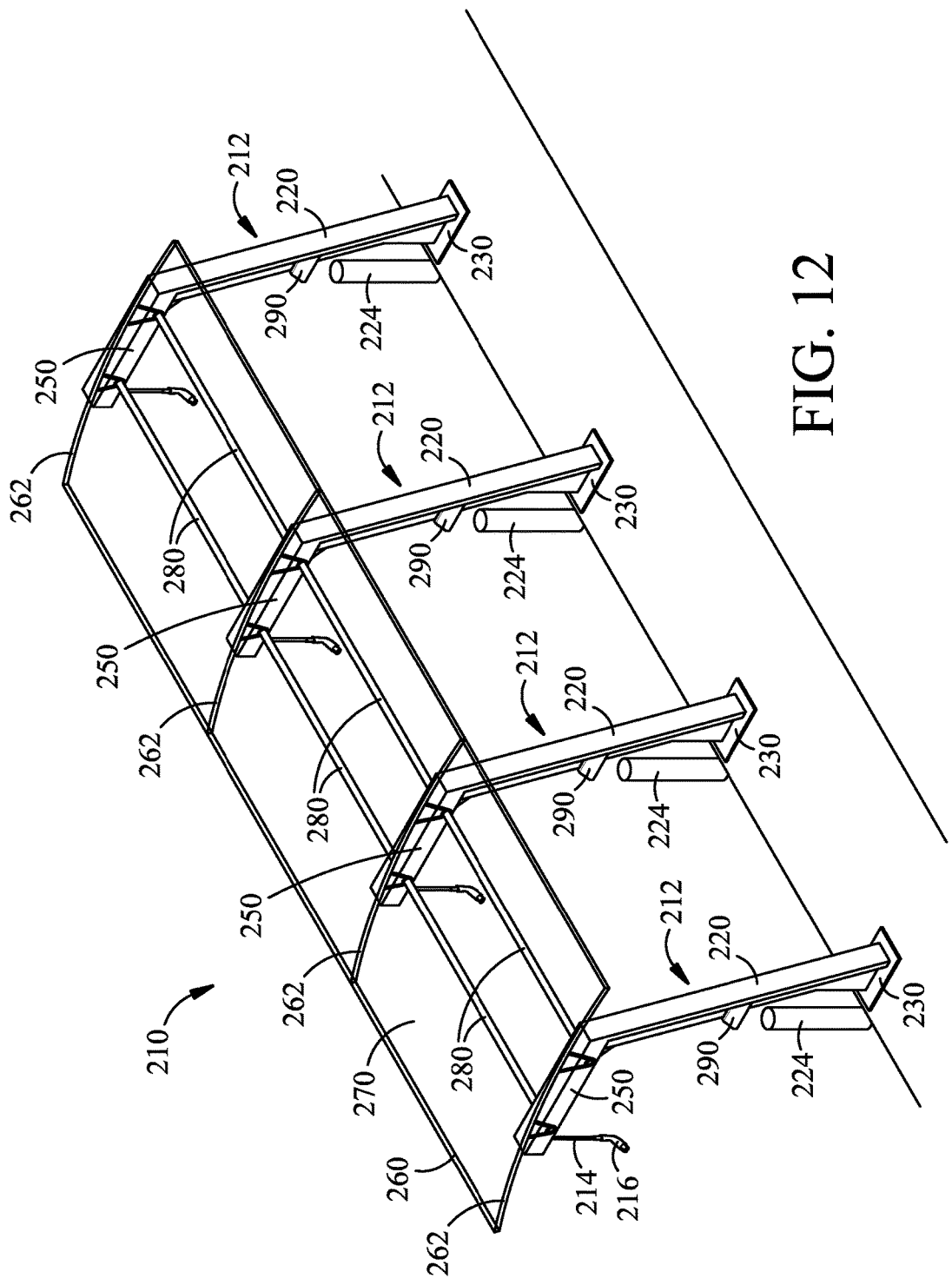
FIG. 12 is an overhead perspective view, from an opposite angle thereof, of the charging facility of FIG. 11.

With reference to FIGS. 11 and 12, another embodiment of a charging facility with an overhead retractable cable is designated generally by the numeral 210. Overhead charging facility 210 has a modular construction to provide a series of multiple stations 212, each associated with a separate parking space S1, S2, S3, S4 . . . . In the illustrated embodiment, there are four charging stations 212. Each of the charging stations is adapted, via an overhead power cable 214 and a terminal connector 216, to provide a source of electric power for charging the battery system of an electric vehicle. The charging facility 210 may be expanded to provide numerous charging stations as desired and is especially adaptable for being configurable to the desired number of charging stations due to its modularity and design characteristics. The charging facility 210 is preferably a standalone outdoor installation which provides publicly accessible power for charging the batteries of electric vehicles. The charging facility 210 has a sleek efficient construction with a protective overhead cover for the vehicle while being charged.

Multiple substantially identical stanchion units 220 are preferably transversely equidistantly spaced. Each stanchion unit 220 comprises a base plate 230, an upright 240 and an overhead support member 250 which is preferably mounted in a cantilever-type arrangement with the upright. The plate 230 is preferably bolted to an elevated concrete platform 222 which extends above an adjacent parking area. A barrier post 224 is preferably disposed in front of each stanchion unit 220. The upright 240 preferably includes a slightly angled steel or metal beam 242. A rectangular tubular back cross brace 244 is preferably welded or affixed to the rear of the beam 242. The beams 242 and 244 are rigidly affixed to the base plate 230. The support member 250 is preferably a tubular steel or metal member which has a downward frontal opening 252 through which the retractable power cable 214 is suspended.

A pair of bosses 253 and 254 project transversely from the sides of the upper member 250. V-shaped struts 256 and 258 are fastened to the bosses and project upwardly to connect with an arcuate member 262 of a canopy frame 260. The frame 260 supports an overhead canopy 270 which extends transversely across each of the canopy supports of each of the stanchion units. The canopy functions as a protective roof which extends across a portion of the vehicle when parked in a parking space. The canopy 270 provides shelter for using the charging station and charging the vehicle at an outdoor location. It should be appreciated that, depending upon the specific location of the battery terminal on the given vehicle, the vehicle may be either driven forwardly or backed into the parking space to provide protection from the elements for the power cable 214 upon connection with the terminal of the vehicle charging circuit.

Tubular brackets 280 extend from stanchion unit 220 to stanchion unit 220 to provide reinforcement and also to provide conduits for a power tap-off to succeeding charging stations 212.

At a convenient intermediate location, a control console 290 projects forwardly from the upright 240. Each control console 290 preferably has a sleek side trapezoidal form with a frontal face 292 having control buttons and various input keys 294 for obtaining access to power for charging the vehicle and for billing the operator for the used power. Preferably, there is also a screen 296 to indicate the charging condition and advise the operator of the time of the charge, the power consumed and the cost of the charge. For some embodiments, a proximity sensor 298 may also be mounted to the control console as shown in FIG. 15.

Figure 13:
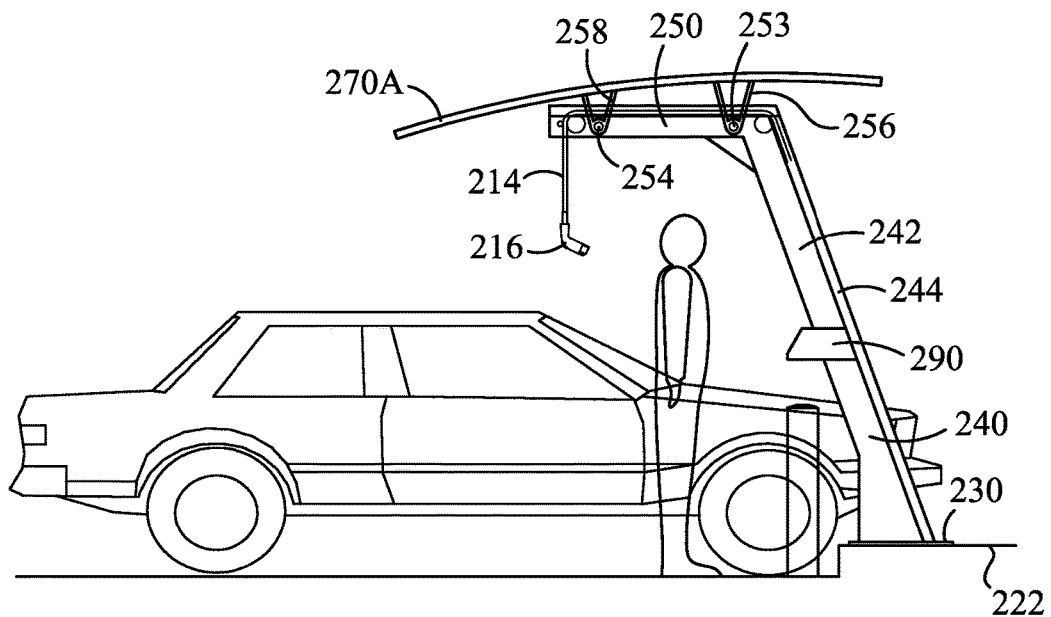
FIG. 13 is a side elevational view, portions removed, of a charging facility and a vehicle in an associated parking space together with a representative operator.
Figure 14:
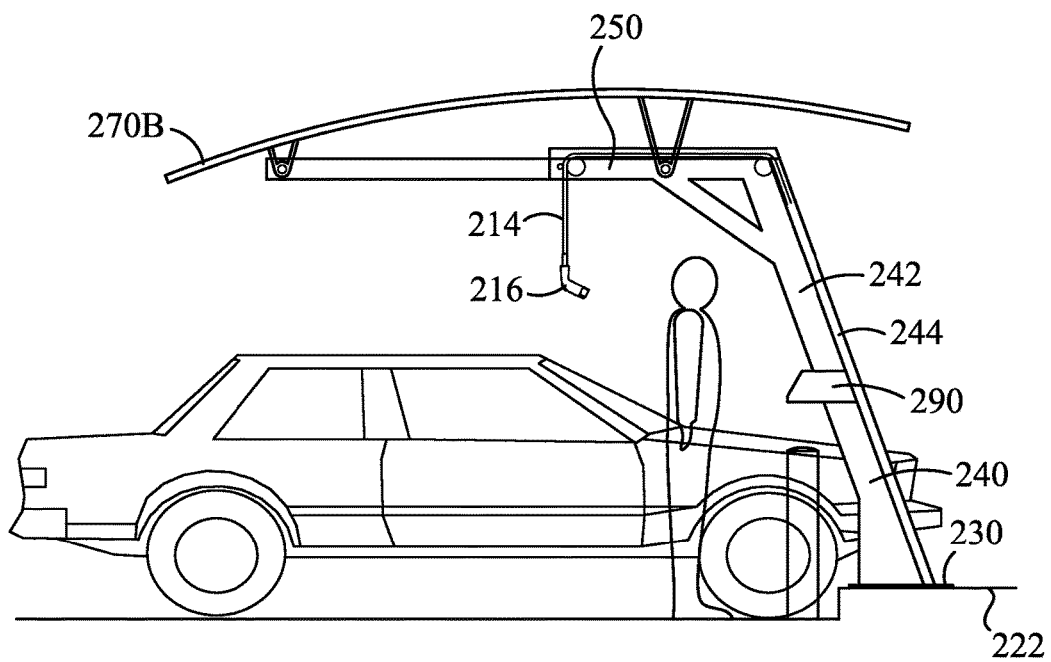
FIG. 14 is a side elevational view, portions removed, of an alternative construction of a charging facility, parking space, vehicle and representative operator.

FIGS. 13 and 14 illustrate two alternative configurations for the overhead canopy. In FIG. 13, the canopy 270A extends only a portion over the vehicle. In FIG. 14 the canopy 270B extends for a greater proportion over the vehicle. This type of canopy is more suitable for northerly climates where extensive snow loading on the canopy may occur.

It will be appreciated that the charging facility has a construction wherein an additional charging station may be efficiently provided by merely providing an additional stanchion unit 220 and extending the canopy 260. In addition, tubular brackets 280 bridge the stanchion units 220 and function as conductor conduits for the power supply for the additional charging station 212.

Figure 15:
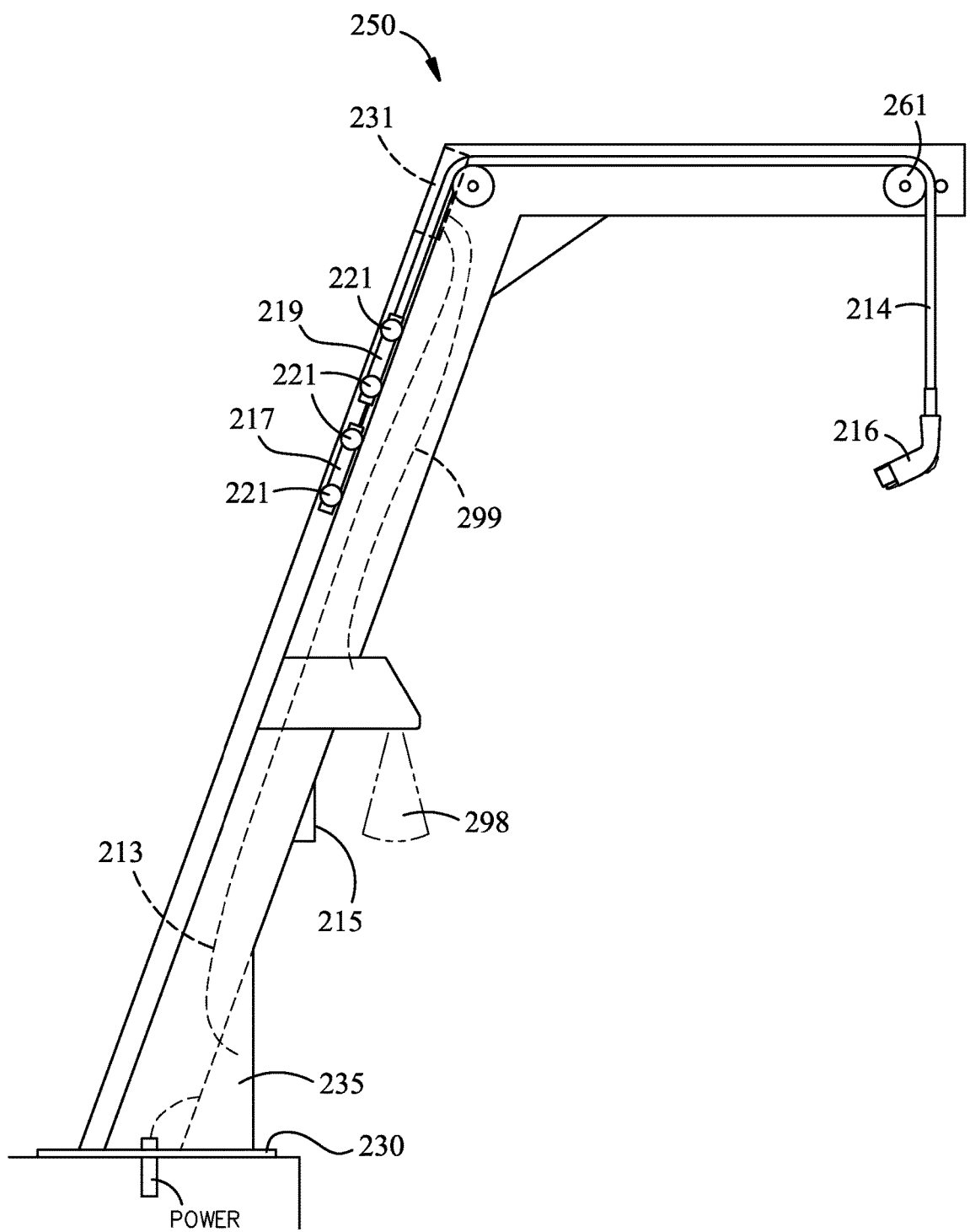
FIG. 15 is a side elevational view, partly broken away, partly annotated, and partly in phantom, to show detail of a retractable cable feature of the charging facility.
Figure 16:
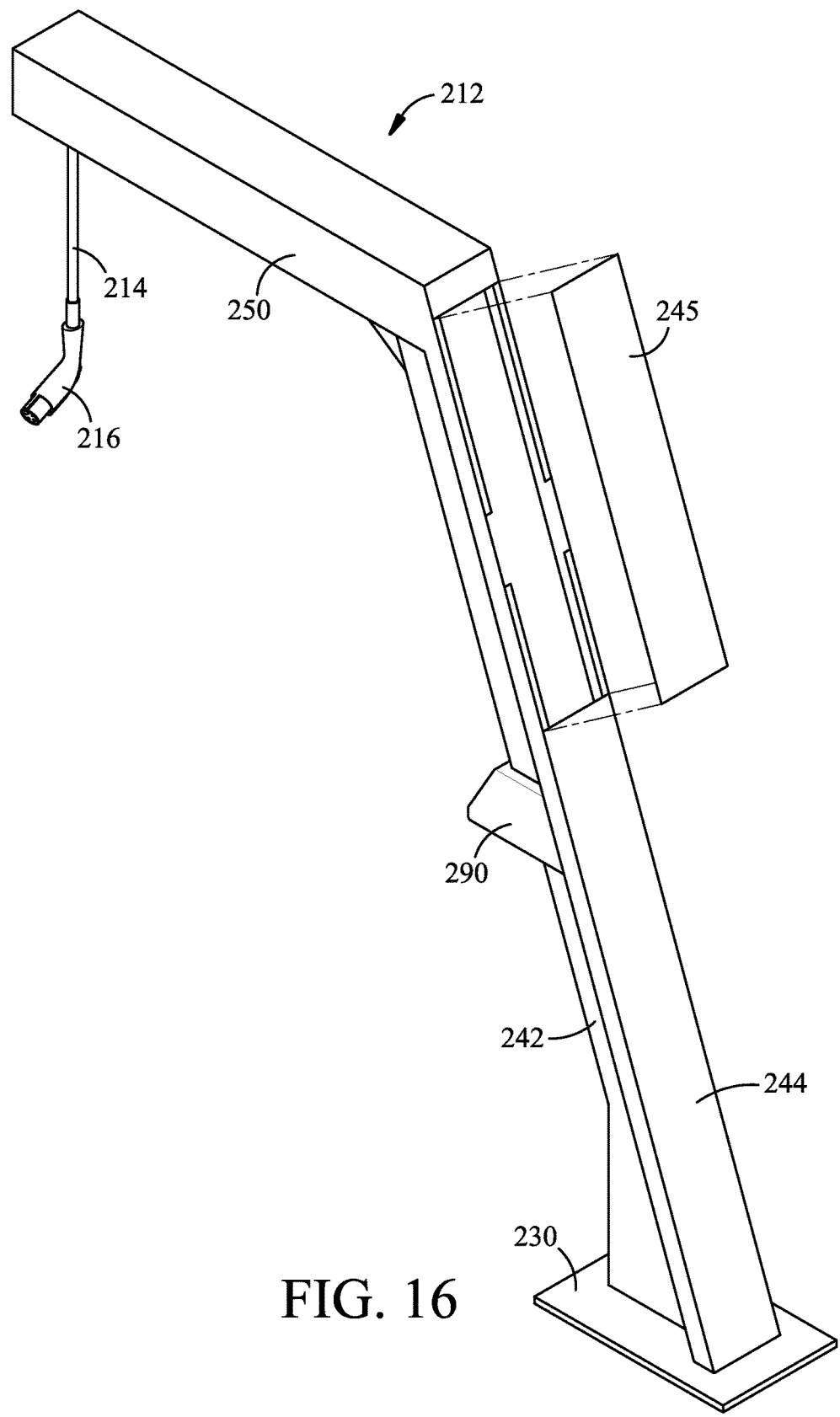
FIG. 16 is a rear exploded view of a stanchion for the charging facility.
Figure 17:
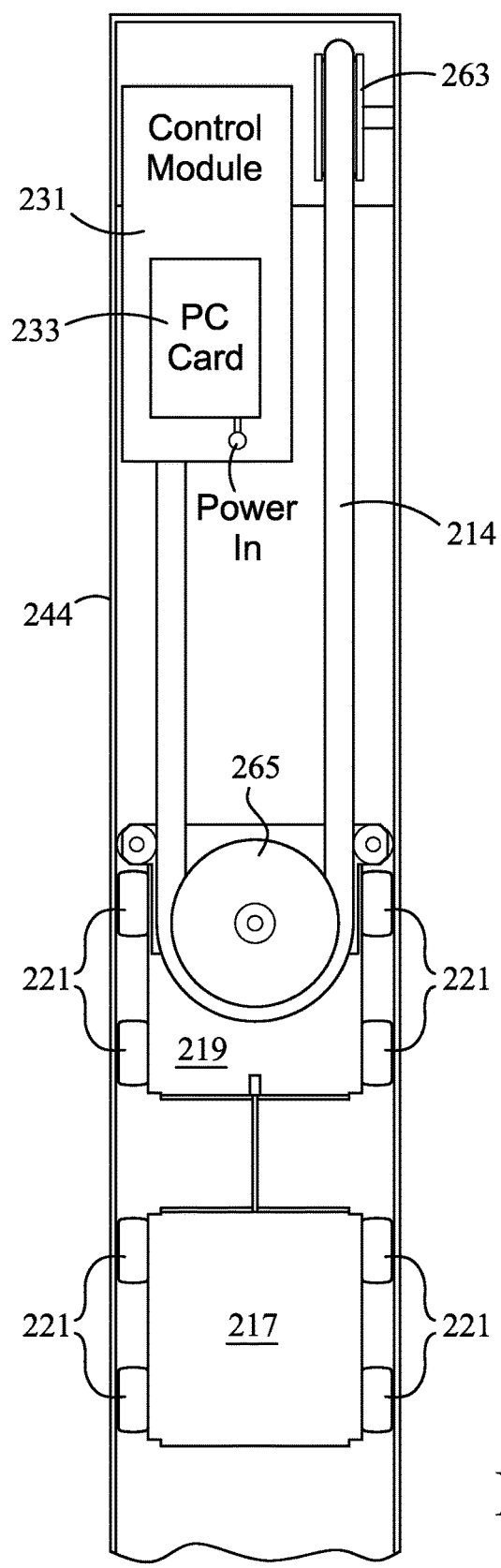
FIG. 17 is an annotated sectional view, partly in schematic, taken along the lines 17-17 of FIG. 15.

With additional reference to FIGS. 15-17, each power cable 214 includes a terminal 216 which mates with the recharging terminal of the electric vehicle. The power cable 214 connects via a power line 213 with the power supply at a junction box 235 and is controlled by a controller 231 which controls the electric power supplied to the cable terminal 216. The controller includes a PC card 233 which is responsive via a control signal 299 from the proximity sensor 298 for controlling the power applied to the terminal 216. The control circuit which includes a ground fault detector for determining a ground fault and preventing the flow of power until the grounding with the vehicle is properly completed. The control circuit also includes circuitry for determining when the charge is completed and terminating the charge to the vehicle battery.

The retractable cable 214 extends around a pair of idle pulleys 261 and 263 and a pulley 265 carried by a variably positionable cable trolley 219. A counterweight in the form of a weight trolley 217 connects with the cable trolley 219 as illustrated in FIGS. 15 and 17. The trolleys 217 and 219 have rollers 221 which slide along the tubular channel of the inclined brace 244. A removable access panel 245 may be removed to provide access to the controller 231 and the trolleys 217 and 219. A 110 VAC outlet 215 may also be mounted on the stanchion (FIG. 15).

Figure 21:
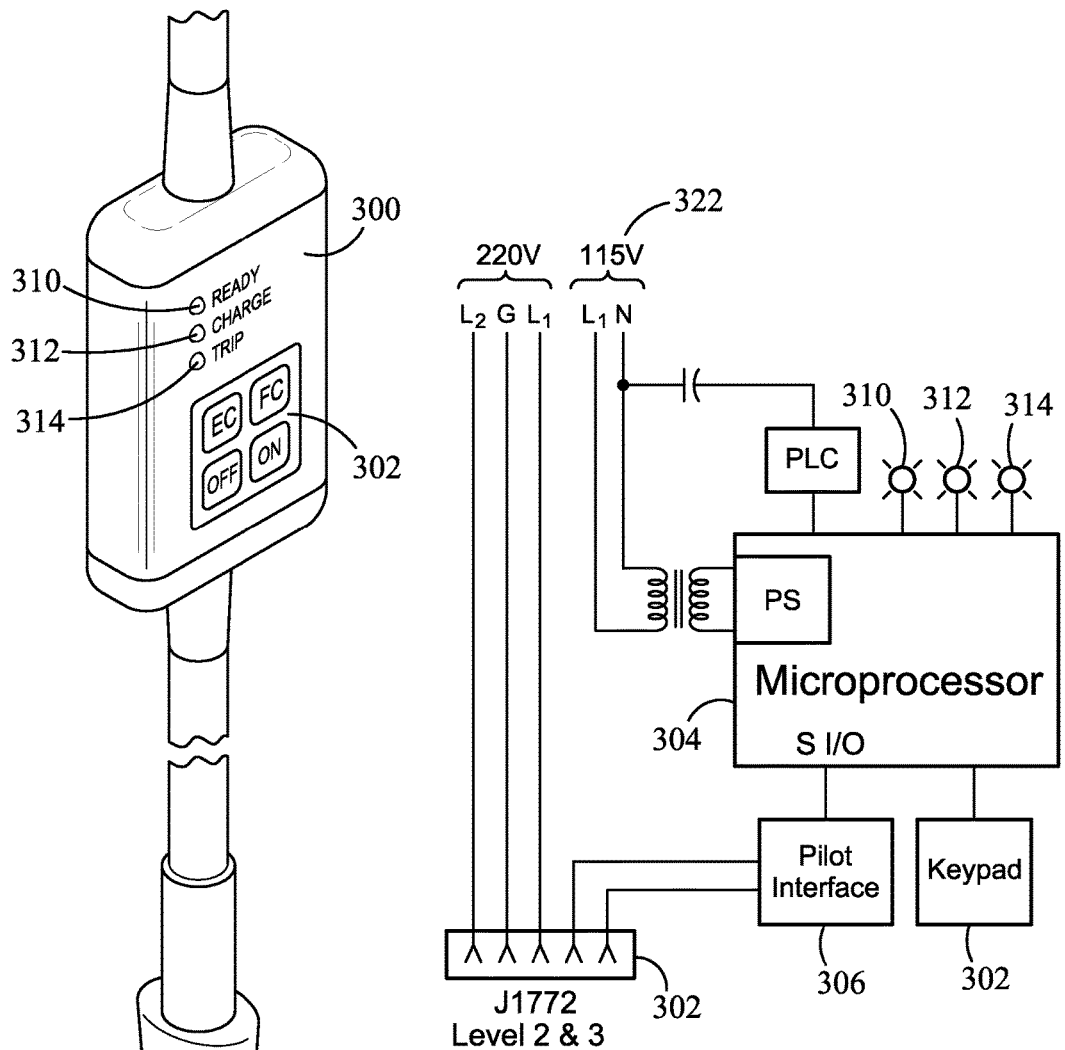
FIG. 21 is a schematic diagram for the connector and the control of FIG. 20.
Figure 20:
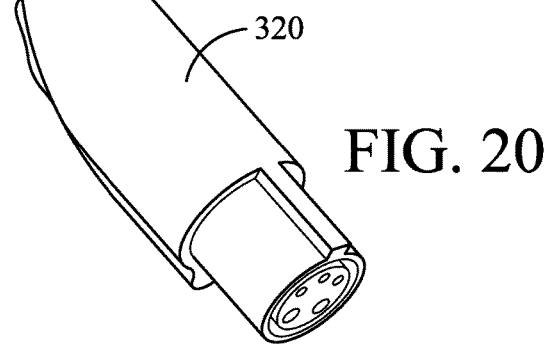
FIG. 20 is a perspective view, portions broken away, of a power cable, a connector and an associated control for a charging facility.
Figures 22, 23:
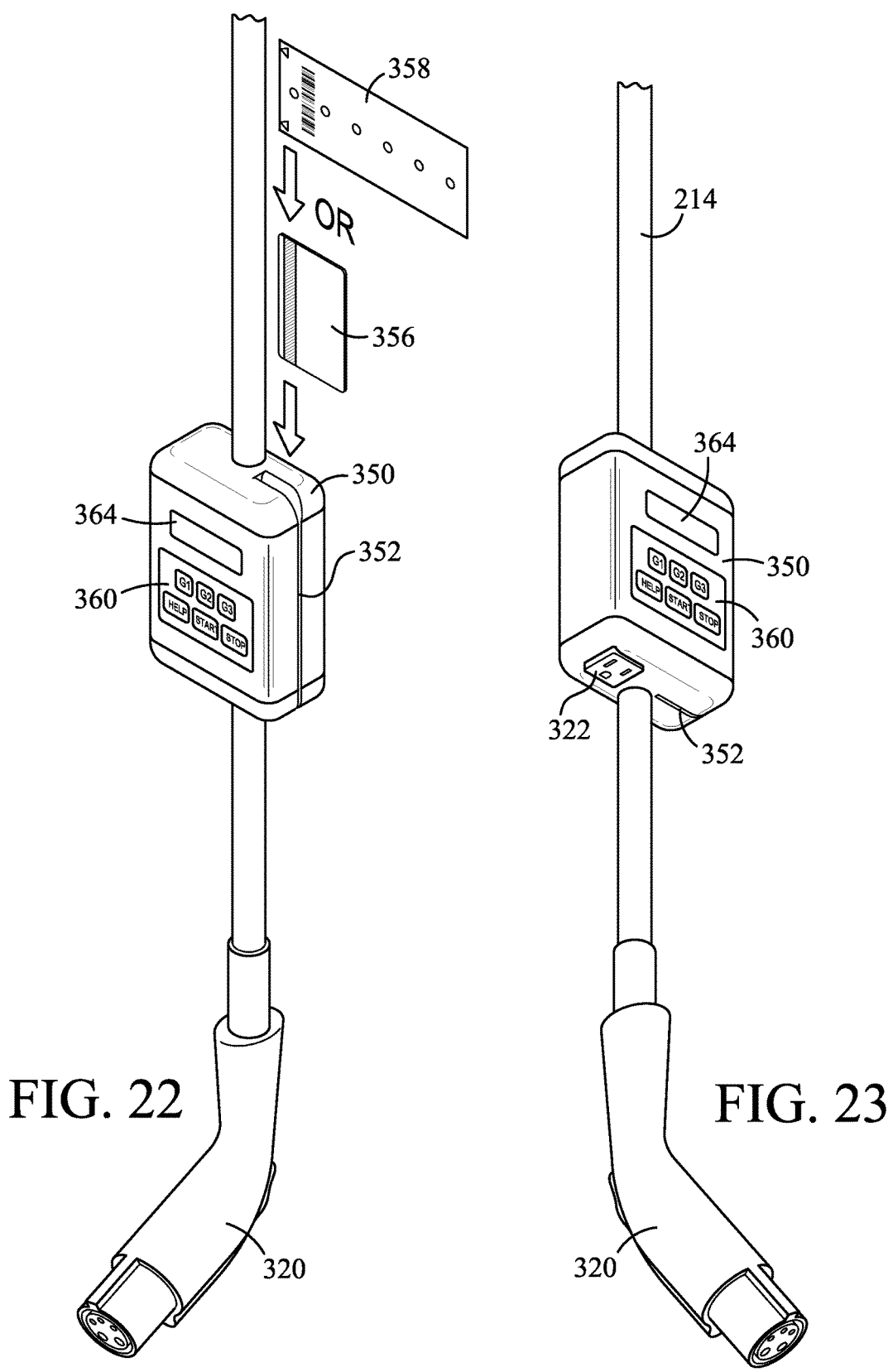
FIG. 22 is a perspective view of an end portion of the power cable of FIG. 20 including a terminal connector and a reader and further illustrated in schematic to show the reader function.
FIG. 23 is a second perspective view of the cable, reader and connector of FIG. 22 taken from a different viewing angle.
Figure 24:
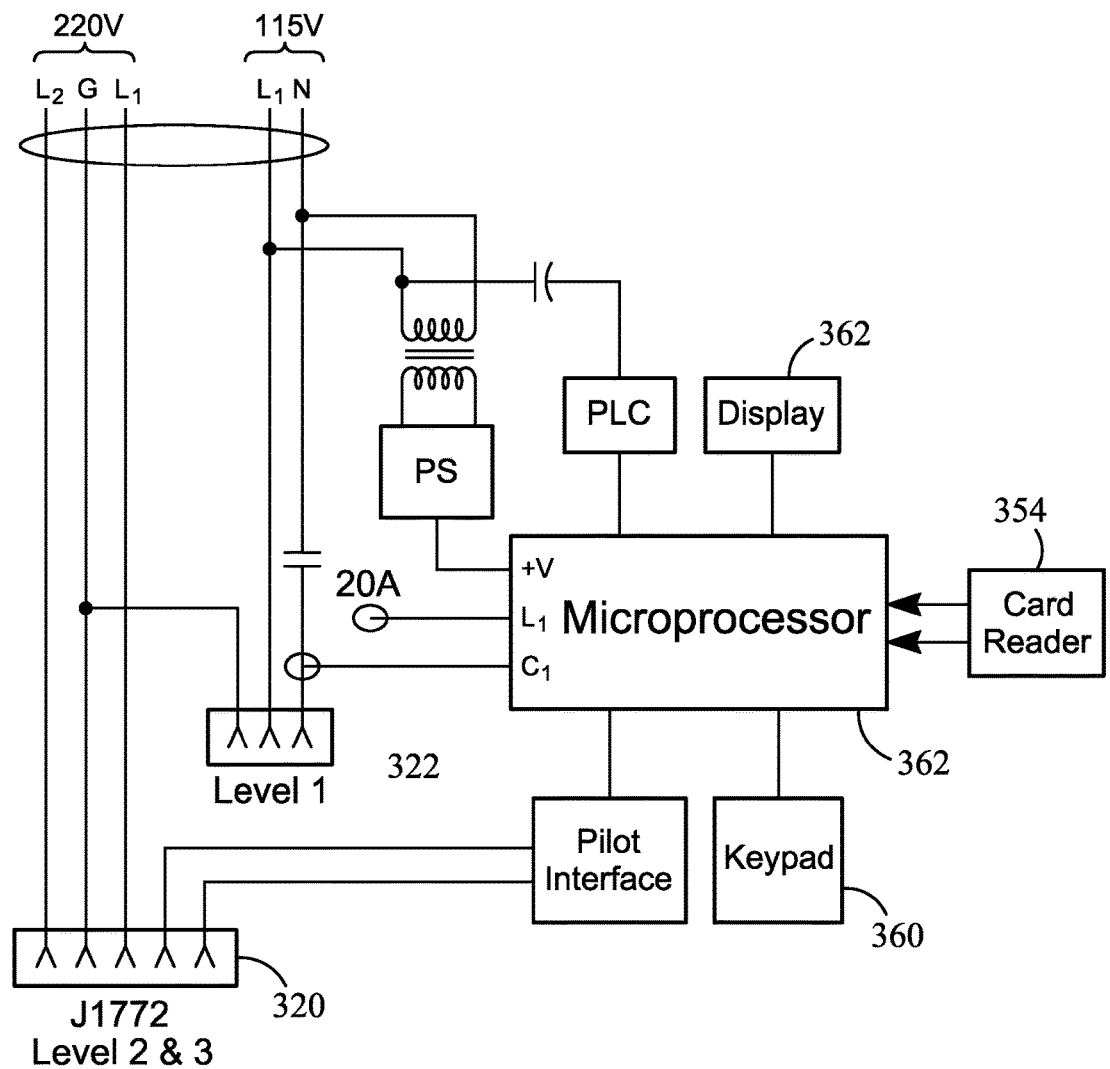
FIG. 24 is schematic diagram for the connector and reader for FIG. 22.
Figure 25:
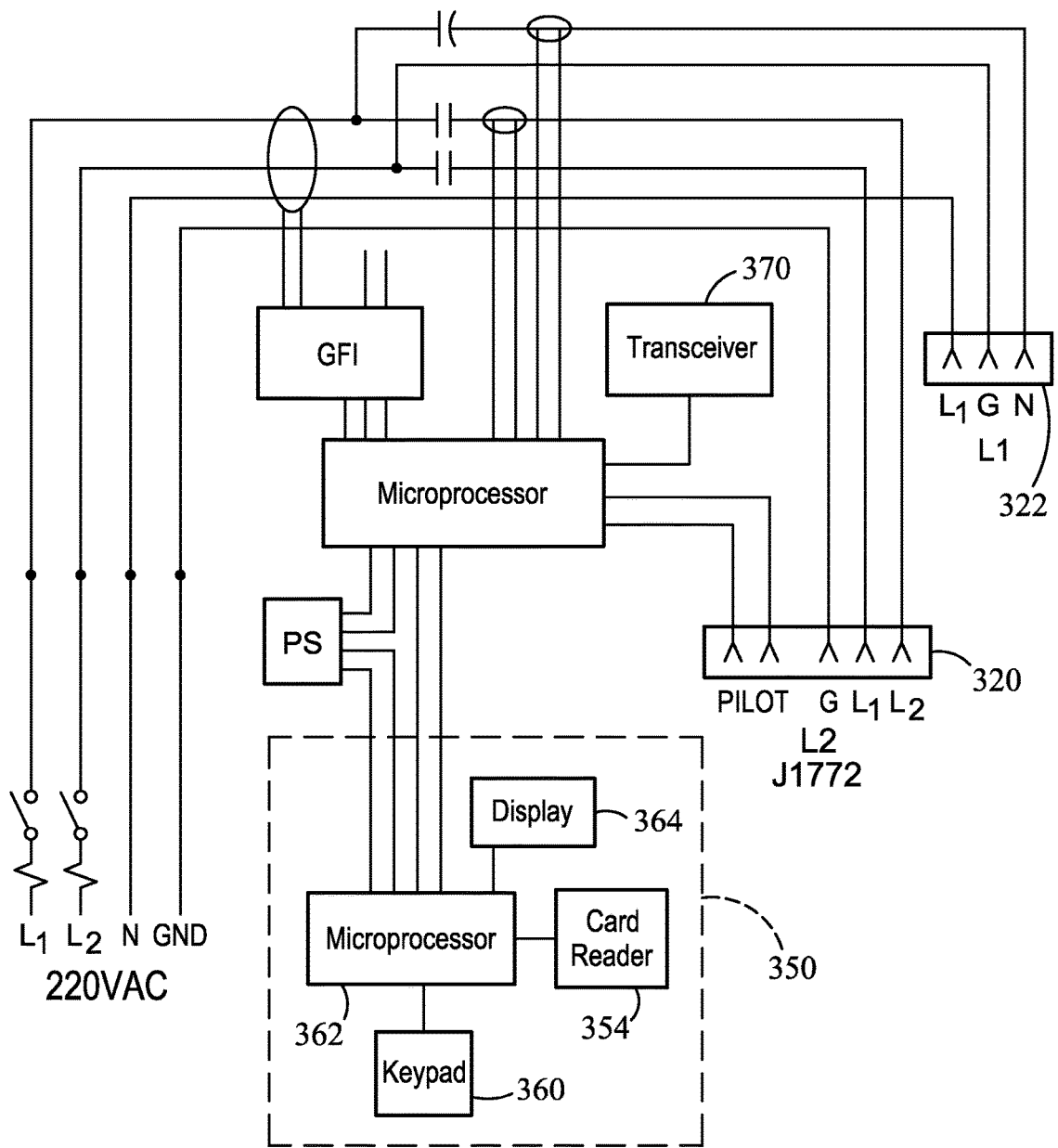
FIG. 25 is a schematic diagram for a charging station.

The terminal connector may have a number of configurations such as a J1772 level 2 and 3 terminal connector 320 illustrated in FIGS. 20 and 21. In addition, provision may be made for both 220-volt and 115-volt charging as illustrated by the terminals and outlet 322 in FIGS. 21 and 23.

The power cable connecting end may assume a number of forms. In one form illustrated in FIG. 20, a control module 300 is mounted proximate the terminal connector 320. The module 300 includes a keypad 302 which provides input to a microprocessor 304. The adjacent terminal connector is configured as a type 2 connector with a 220V power output. Additional power output may be provided at the control module. A pilot interface 306 is employed to detect a ground fault. The module also includes LEDs 310, 312 and 314 for indicating that the terminal is ready for use, that the vehicle is charging or that a trip condition has been detected and implemented.

With reference to FIGS. 22-25, the control module 350 includes a slot 352 for a reader 354 for a card reader 356 or a ticket 358. The module 350 includes a keypad 360 which also provides an input to a microprocessor 362. The level 1 output 322 is provided at the underside of the module. The module also has a display 364 for displaying the various messages as required. As further indicated in FIG. 25, data indicative of the charging may also be forwarded over a transceiver 370 to a central control (not illustrated).

The controller communicates with the input and output functions of the controller and console either via hardwiring or via RF communication or other communication protocols. The control console also ultimately communicates with a remote server for transmitting and communicating information concerning the identity of the operator using the power supply as well as data and information to pay for and/or bill for the power consumed during the charging. The power console screen also provides information concerning the volume of energy supplied during the charge as well as the cost for the supplied power. The console also alerts the operator when the charge is completed. In addition, information concerning the charging time and/or the time remaining for a preset time charge may also be provided at the console screen.

Figure 26:
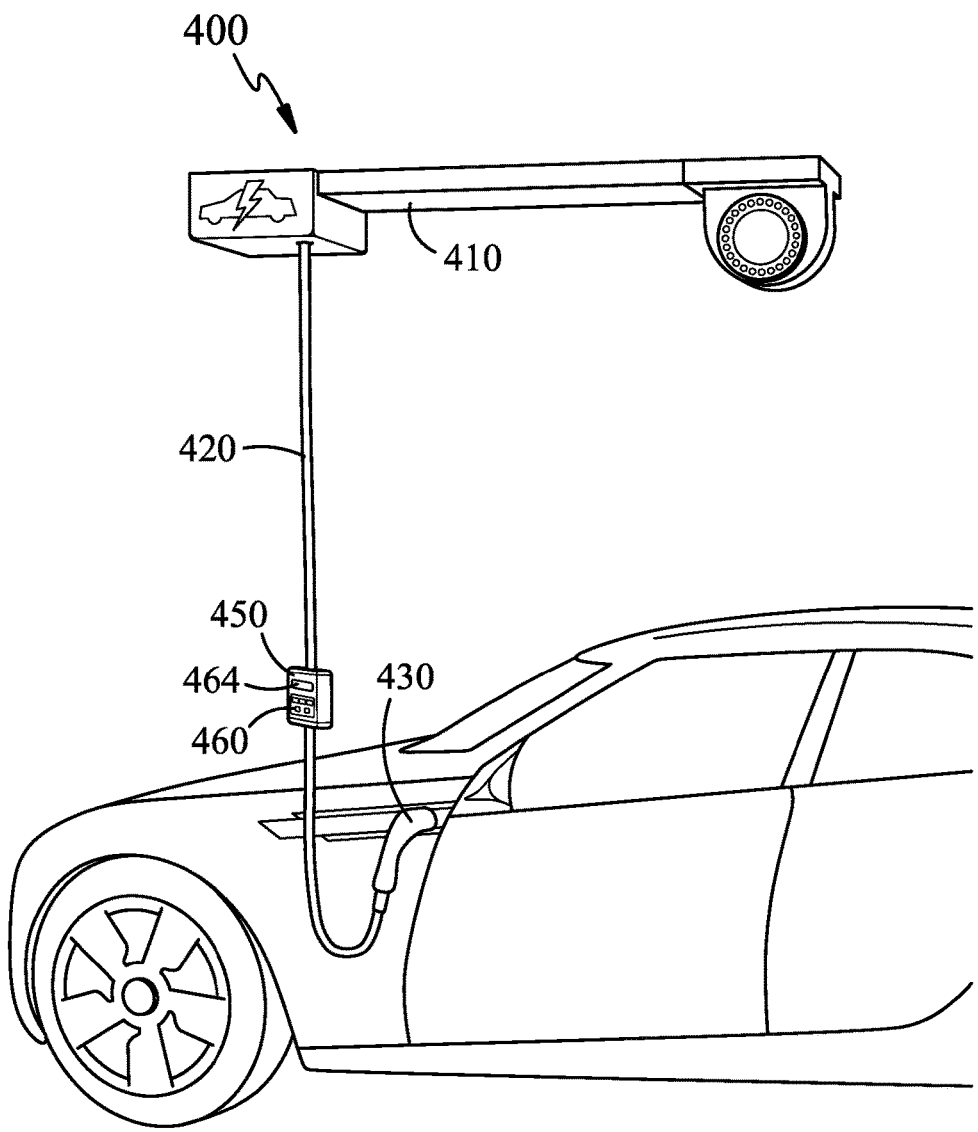
FIG. 26 is a perspective view of an overhead electric vehicle charging station with a retractable power cable being connected to a vehicle (partially illustrated) for charging.

With reference to FIG. 26, an electric vehicle charging station which incorporates an overhead retractable power cable is generally designated by the numeral 400. The cable retraction mechanism is housed within a conformal housing 410 which mounts to the ceiling of a facility, or is otherwise suspended in an overhead orientation. A single retractable power cable 420 includes a power connector 430 which connects with the charging terminal of the electric vehicle as illustrated in FIG. 26. The cable mounts a control module 450 with a keyboard 460 and a display window 464.

Figure 27:
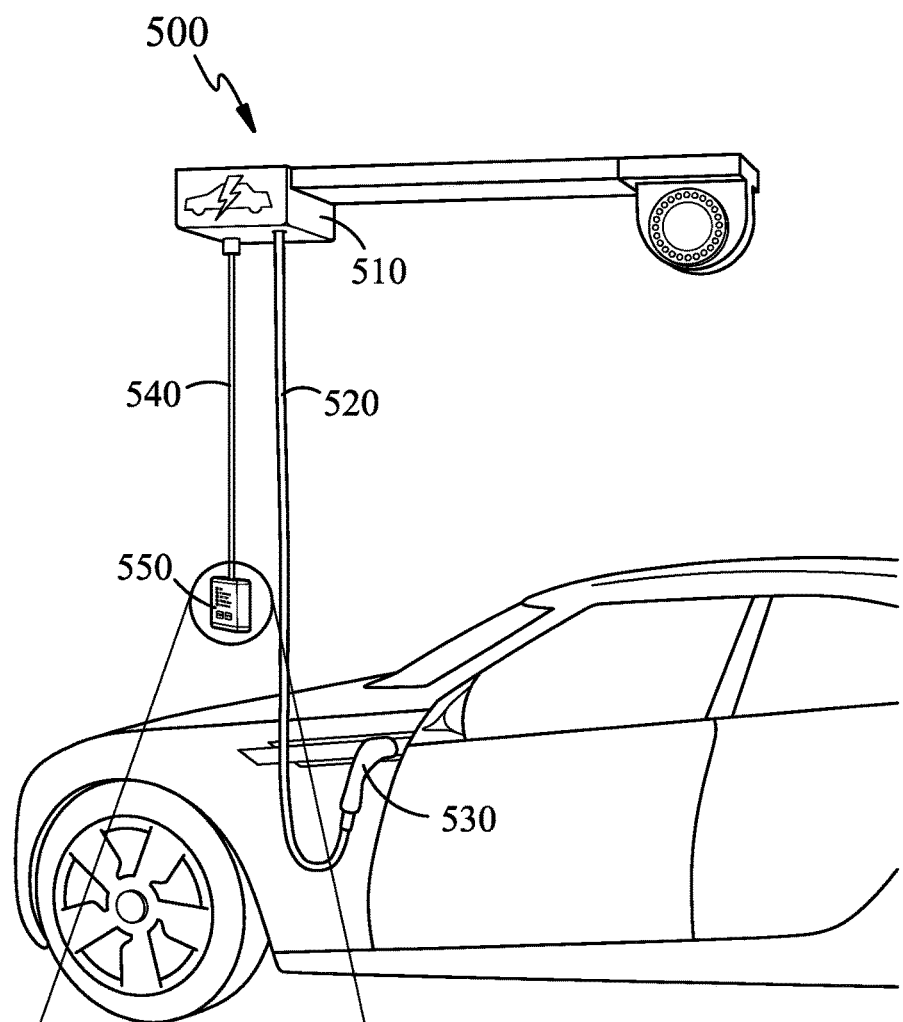
FIG. 27 is a perspective view of another embodiment of an electric vehicle charging station with the retractable power cable connected to a vehicle (partially illustrated) for charging.
Figure 27A:
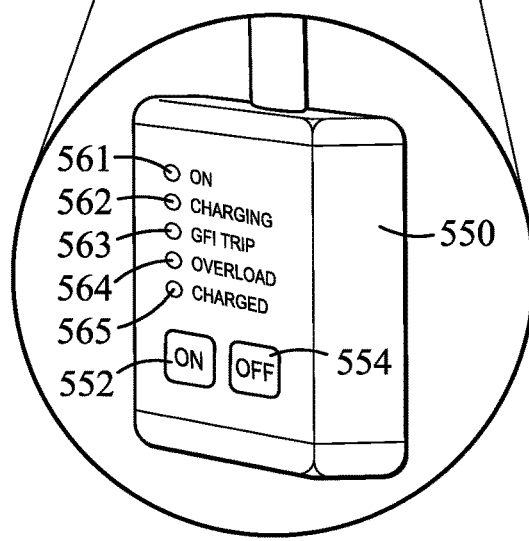
FIG. 27A is an enlarged view of the circled portion of FIG. 27.

With reference to FIG. 27, an electric vehicle charging station which includes an overhead retractable power cable is designated generally by the numeral 500. The retractable power cable 520 has a connector 530 which connects with the charging terminal of the electric vehicle. A cord 540 is also suspended from the forward portion of the housing 510. The cord connects with a control module 550 which remains suspended in a generally fixed position (which can be adjustable) above the floor of the parking bay. The control module 550 may thus be relatively easily accessed by the operator. The module 550 includes an on button 552 and an off button 554 and various LED indicators 561-565 which, for example, respectively indicate that the power is on, the vehicle is charging, there is a ground fault trip, there is an overload and the vehicle is fully charged.

Figure 28:
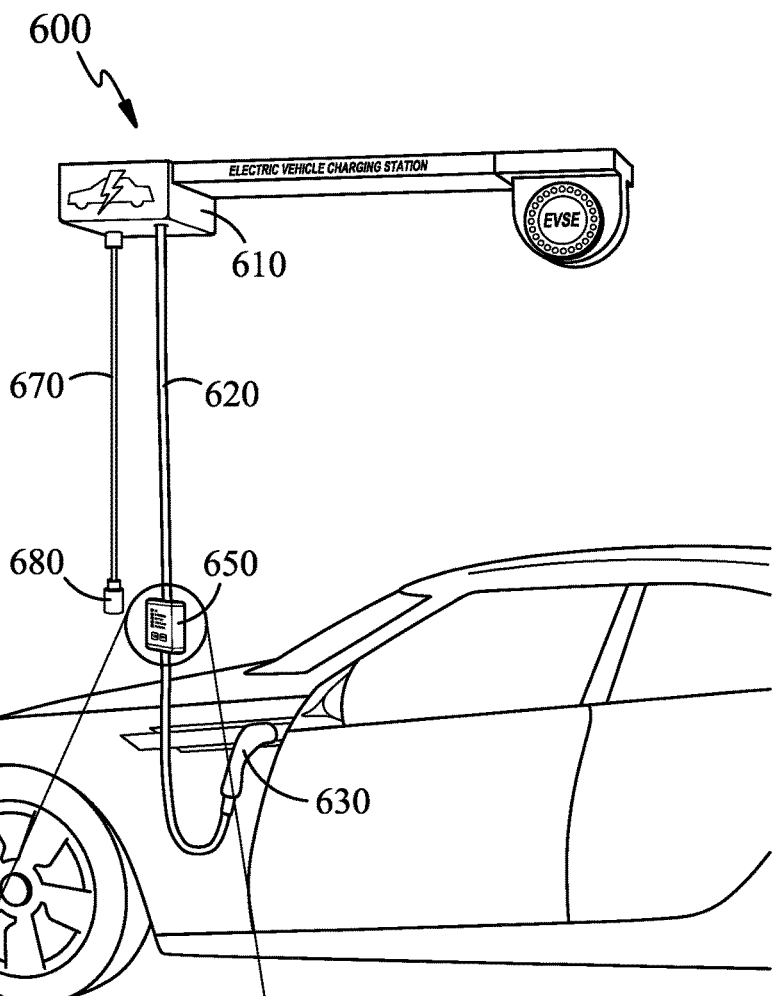
FIG. 28 is a perspective view of an additional embodiment of an electric vehicle charging station illustrated with the retractable power cable being connected with an electric vehicle (partially illustrated) for charging.
Figure 28A:
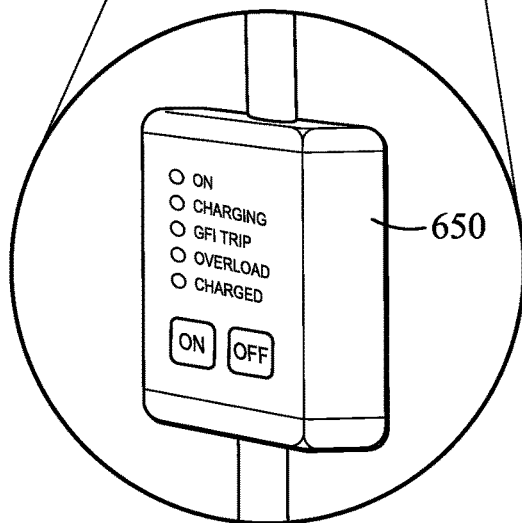
FIG. 28A is an enlarged perspective view of the circled portion of FIG. 28.

With reference to FIG. 28, an electric vehicle charging station which incorporates a retractable power cord is designated generally by the numeral 600. The power cable 620 connects with a level 2 connector 630 such as a J1772 connector which is capable of supplying 220 volts at 32 amps. The cable 620 also includes a module 650 for operating the charging and indicating the condition of the charge function. In addition, a second retractable cable 670 is suspended from the housing 610. The cable 670 connects with a level 1 connector 680 which may, for example, supply 120 volts at 20 amps.

Figures 29A, 29B:
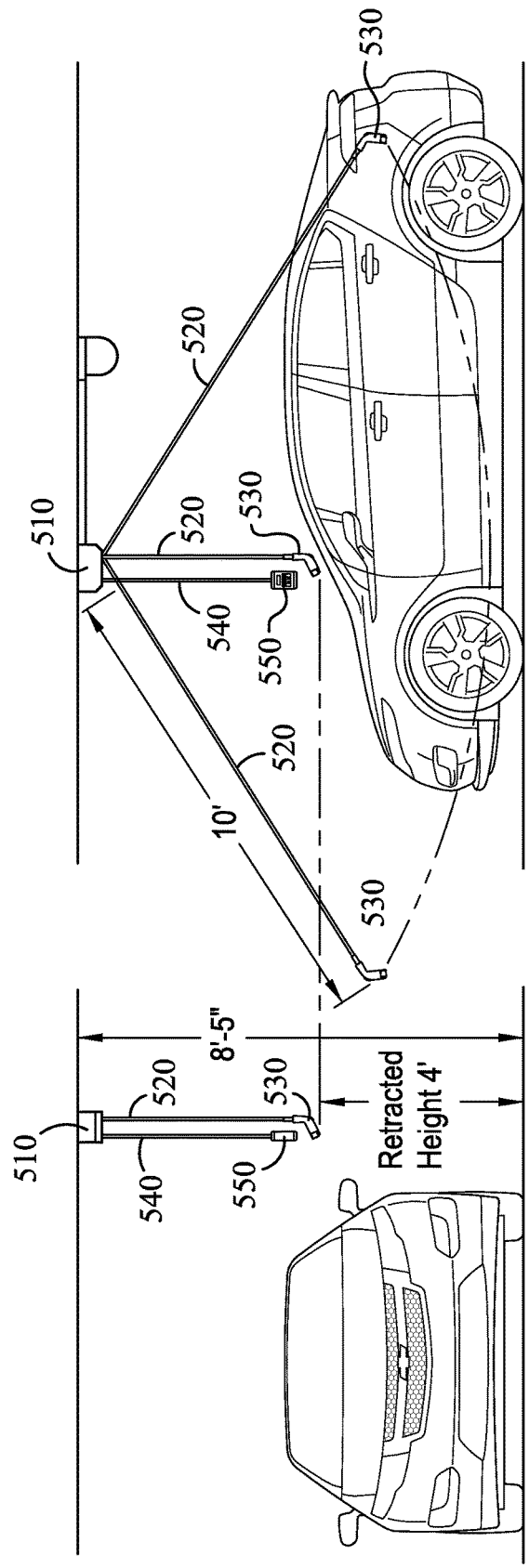
FIG. 29A is a front elevational view, partly in diagram form, of an electric vehicle and an overhead electric charging station illustrating dimensional parameters for a representative electric vehicle charging station.
FIG. 29B is a side elevational view, partly in diagram form, of the vehicle and charging station of FIG. 29A.

One set of preferred positional parameters for the various power cables and connectors is illustrated in FIGS. 29A and 29B. For example, an illustrated preferred position of the connector in a non-usage mode is approximately 4 feet above the surface of the parking bay. The overhead retractable cable system may be suspended from a height, for example, of 8 feet, 5 inches. The power cable 520 in the extended mode such as, for example, wherein a 10 foot arc would be swept out, indicates that the connector 530 may be easily positioned at various positions of the electric vehicle depending upon the location of the cable connector and the manner in which the vehicle is positioned within the parking bay.

Figure 30A:
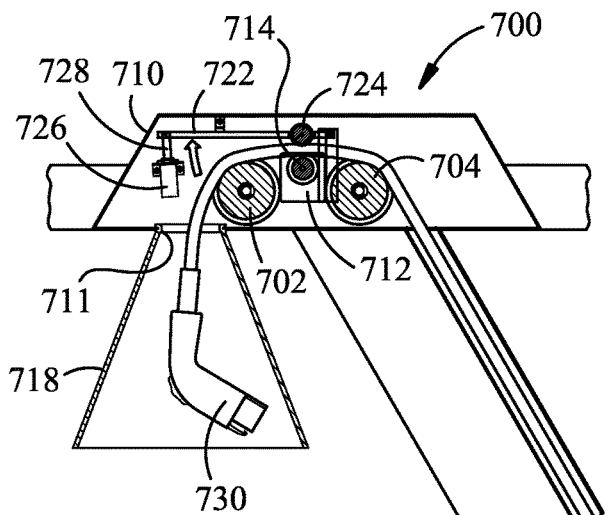
FIG. 30A is a fragmentary diagrammatic sectional view of a stanchion for an overhead charging station further illustrating a mechanism for extending and retracting the power cable, said mechanism being illustrated in a retracted mode.
Figure 30B:
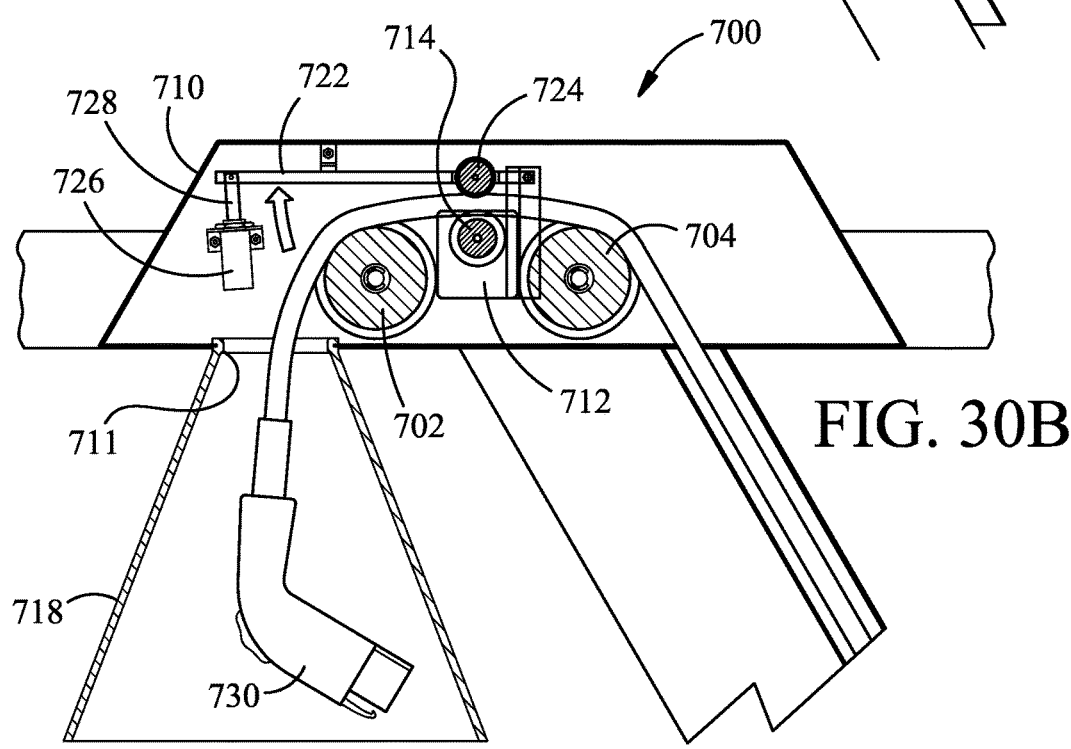
FIG. 30B is an enlarged view of a portion of FIG. 30A.
Figure 31A:
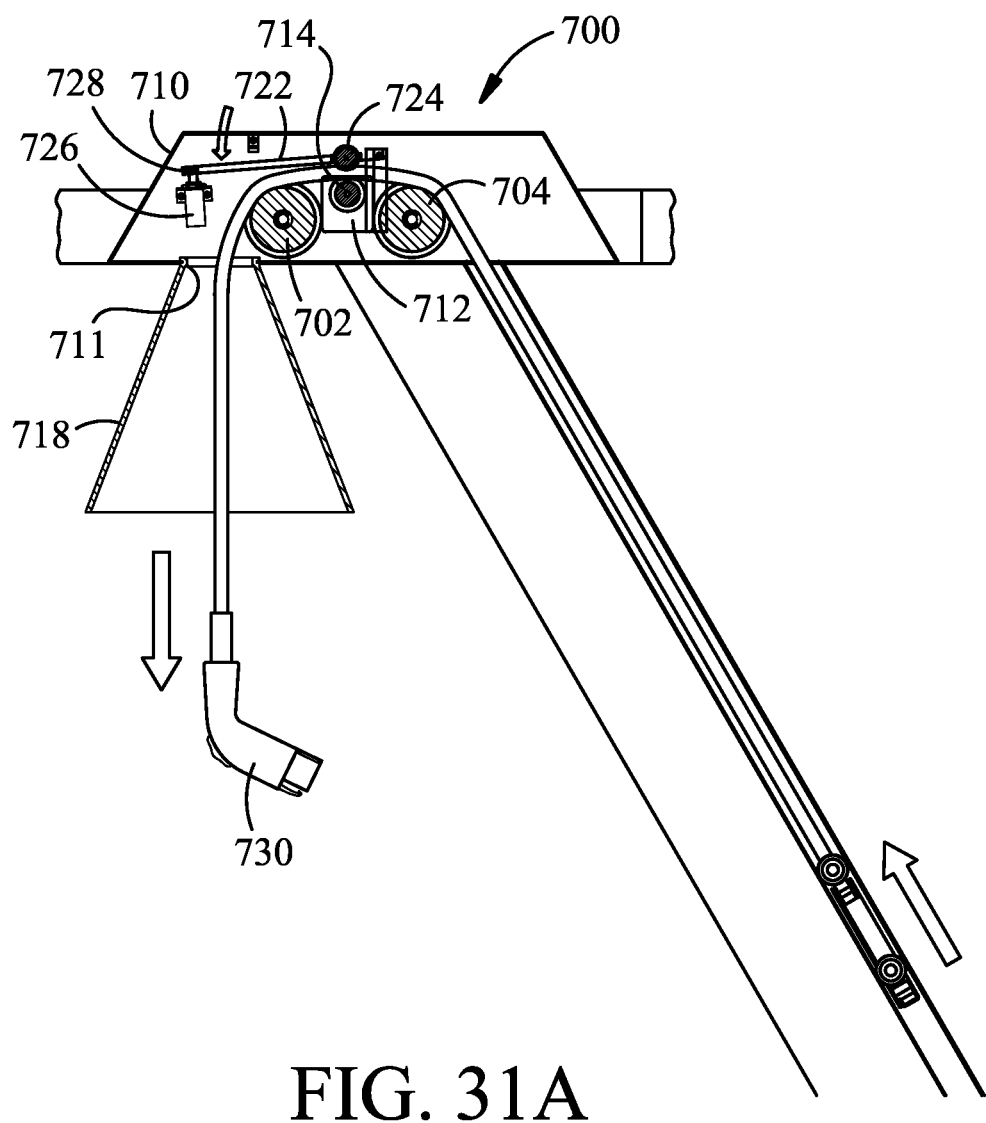
FIG. 31A is a fragmentary diagrammatic sectional view of the stanchion and mechanism of FIG. 30A, said mechanism being illustrated in a drive extending mode.
Figure 31B:
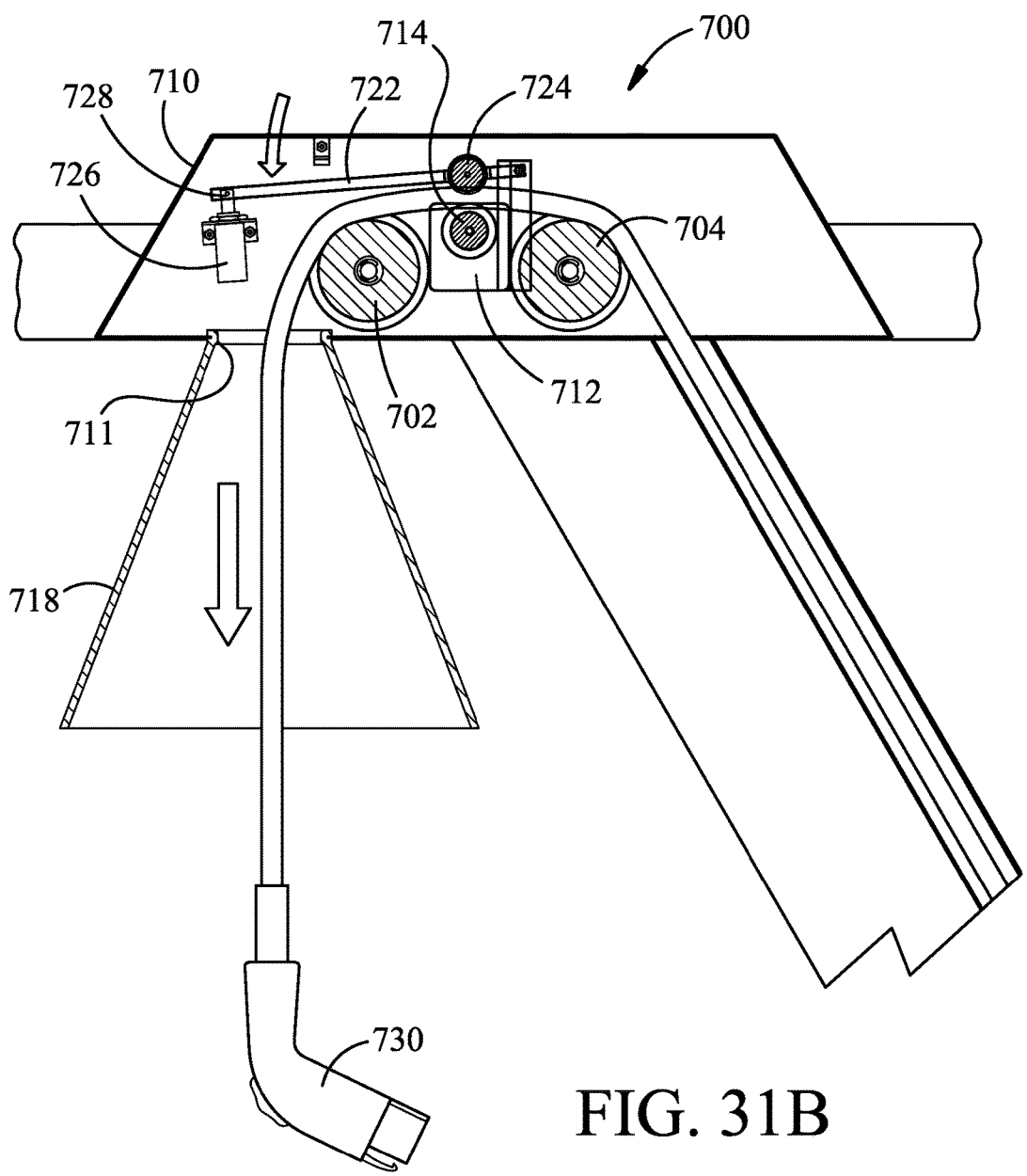
FIG. 31B is an enlarged view of a portion of FIG. 31A.
Figure 32A:
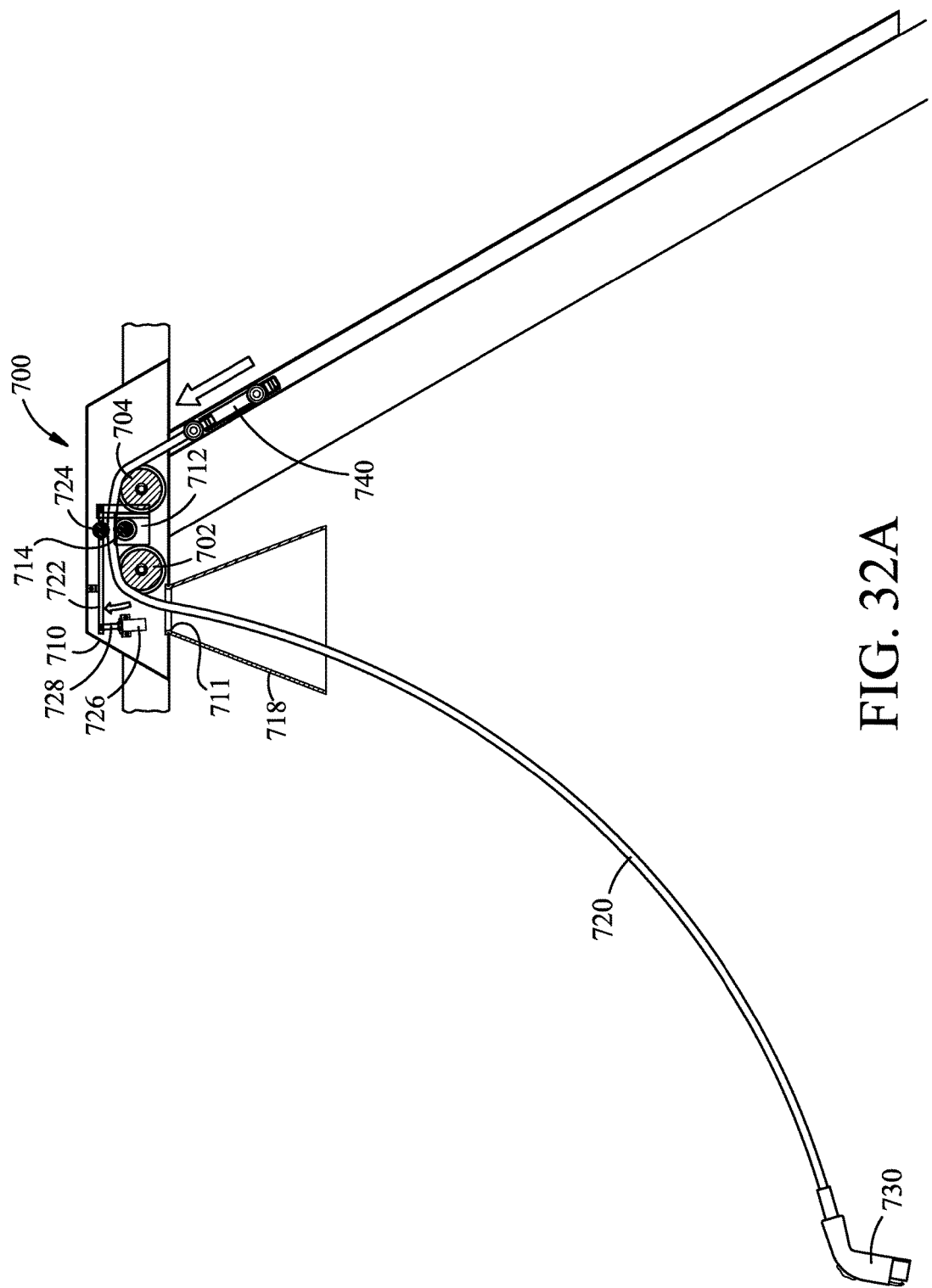
FIG. 32A is a fragmentary diagrammatic sectional view of the stanchion and the mechanism of FIG. 30A, illustrating the mechanism in a free-pull mode with the power cable in an extreme extended position.
Figure 32B:
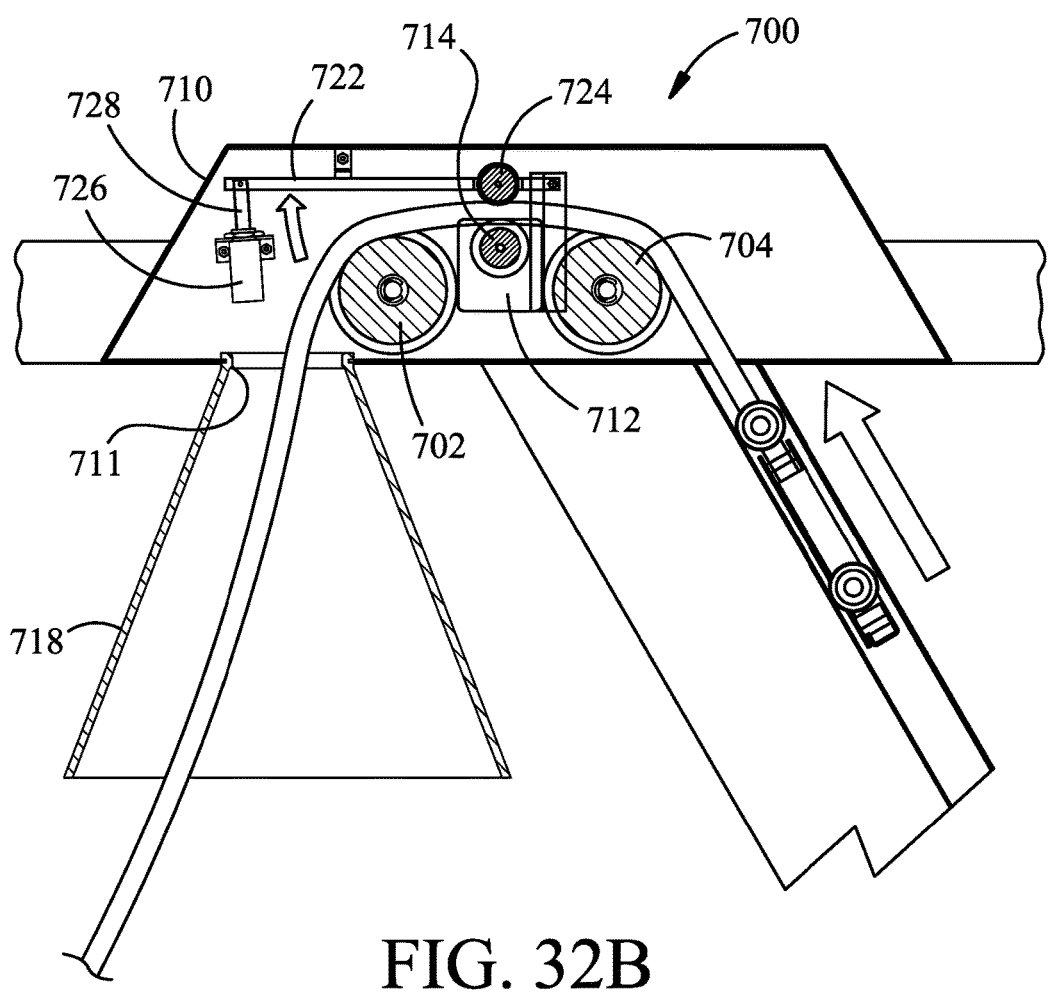
FIG. 32B is an enlarged view of a portion of FIG. 31B.

With reference to FIGS. 30A-32B, a drive mechanism for extending and retracting an overhead power cable as employed on an upright stanchion is generally designated by the numeral 700. The drive mechanism 700 is housed within a housing 710 at the top of the stanchion. The power cable 720 passes through an opening 711 at the bottom of the housing 710. FIGS. 30A and 30B illustrate the drive mechanism 700 as the cable 720 is at the retracted position. FIGS. 31A and 31B illustrate the drive mechanism 700 as the cable is initially moved toward the "ready for use" position. FIGS. 32A and 32B illustrate the drive mechanism 700 as the cable is extended to connect to the electric vehicle.

The drive mechanism 700 includes a pair of idlers 702, 704 which are mounted within the housing 710 and are disposed in generally spaced relationship for rotation about parallel axes. The power cable 720, which is typically a 32 amp or 74 amp cable, is a heavy-duty and relatively heavy cable. The power cable 720 is also somewhat stiff and essentially only semi-flexible and is carried by the idlers with the free end connecting with a J1772 connector 730 and the cable passing through an opening 711 in the stanchion housing.

A motor 712 drives a wheel or drive puck 714 whose rotational axis is parallel to that of the idlers. The drive puck 714 is disposed between the idlers 702, 704. The drive puck 714 is adapted and positioned to selectively engage the underside of the cable as it passes over the idlers 702, 704. An arm 722 is pivotally mounted within the housing above the drive puck. The arm carries a roller 724 having a rotational axis which is parallel to that of the drive puck. A solenoid 726 connects at the opposite end of the arm. The solenoid has an actuator 728 which is variably positionable to essentially raise and lower the pivotal position of the arm and hence raise and lower the carried roller 724. A stop 732 may be mounted above the arm to provide an upper limit position of the arm.

When the arm 722 is in an upper position determined by the solenoid actuator 728, the roller 724 does not contact or either lightly engages the upper portion of the cable which typically assumes a quasi-arc-like configuration between the two idlers, as best illustrated in FIGS. 30B and 32B. When the solenoid moves the arm to a downward pivotal position, the roller 724 engages the cable 720 opposite the drive puck 714 and essentially captures or pinches the cable between the roller and the drive puck, as best illustrated in FIG. 31B.

Rotational motion of the drive puck 714 forces the cable 720 to move either to the right or the left, over the idlers 702, 704 as illustrated in the figures.

The motor 712 is bi-directional so that when the drive puck rotates in a counterclockwise direction (as illustrated in the figures), the cable is forced downwardly from the opening 711 at the bottom of the housing and will essentially be lowered to a "ready to use" position (FIG. 31A) so that the user may visually see the selected cable and easily grasp the cable and/or connector. The solenoid 726 then moves the arm 722 to an upward position (FIG. 32A) wherein the roller disengages from the pinched relationship with the cable. The cable may now be further extended by the vehicle operator from the "ready to use" position, which is typically 4 feet above the pavement, and pulled to connect the connector 730 to the battery charging terminal of the vehicle. Because the roller does not forcefully engage against the top of the cable, the cable is free to be pulled over the idlers 702, 704 and extended, as best illustrated in FIGS. 32A and 32B.

When the battery charging operation is complete, a signal is sent to a controller for the motor and the solenoid. The roller 724 is then downwardly pressed against the cable and the motor is powered to rotate the drive puck in a clockwise direction to retract the cable into the housing. The lower portion of the cable loops around a weight trolley 740, as previously described for trolley 219.

It should be appreciated that when the charging station is not used, the connector is fully housed within a protective shroud 718 (illustrated only in FIGS. 30A and 30B) at the top of the stanchion. When either the vehicle operator uses a card at a kiosk or presses a switch or otherwise commences use of the power charging facility, the motor 712 and solenoid 726 receive a signal and are positioned automatically to extend the cable to a user-friendly height—approximately 4 feet above the pavement. The motor 712 is turned off and the solenoid 726 is actuated to allow the cable to be easily pulled to an extended position suitable so that the connector can be connected with the vehicle terminal for charging.

Upon termination of the charging and disconnection of the power cable 720, the motor and solenoid are actuated to retract the cable to the fully retracted position so that the connector is fully received in the shroud 718. The position of the cable at certain selected positions, namely the fully retracted (FIG. 30A) and the "ready to use" (FIG. 31A) positions, may be sensed by Hall sensors sensing magnets placed on the cable.

At the retracted position (FIG. 30A), the cable is not locked and the arm and roller are in an upper position. If someone pulls on the retracted cable and/or connector, the Hall sensor will sense same and send a signal to drive the motor to retract the cable, thereby providing a safety lock and preventing unauthorized usage.

Figure 33:
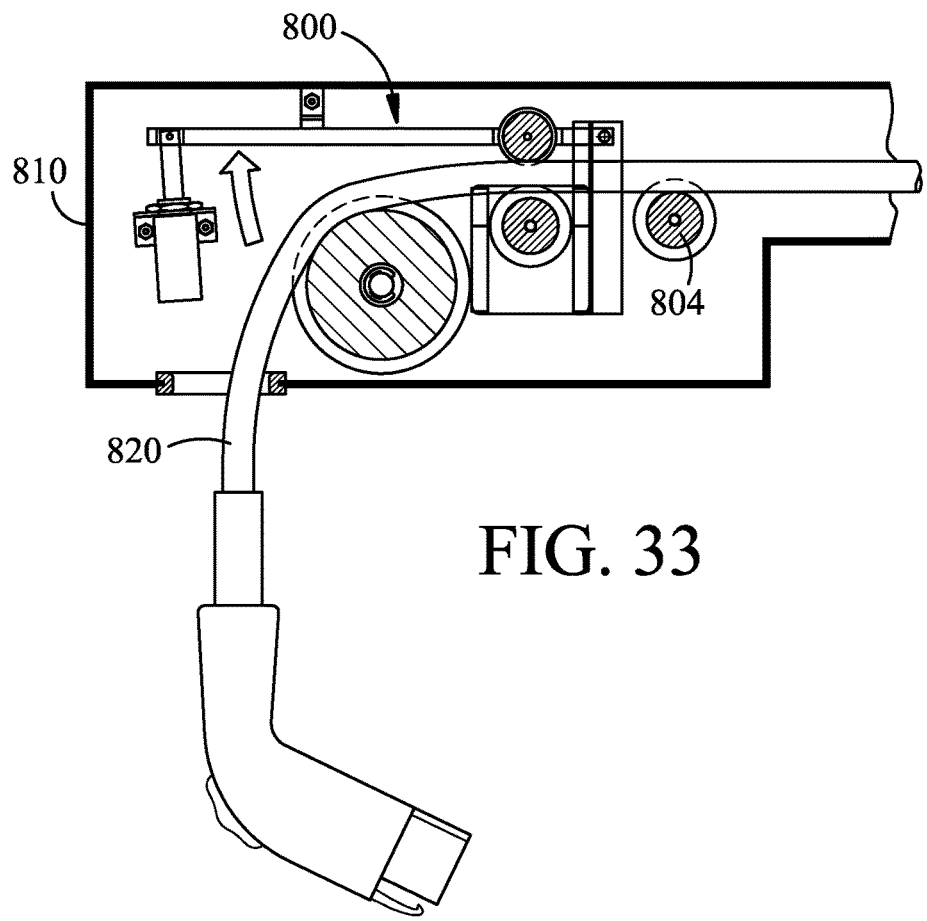
FIG. 33 is a fragmentary diagrammatic sectional view of a retractable power cable mechanism for an overhead housing with the cable being illustrated in a retracted position.
Figure 34:
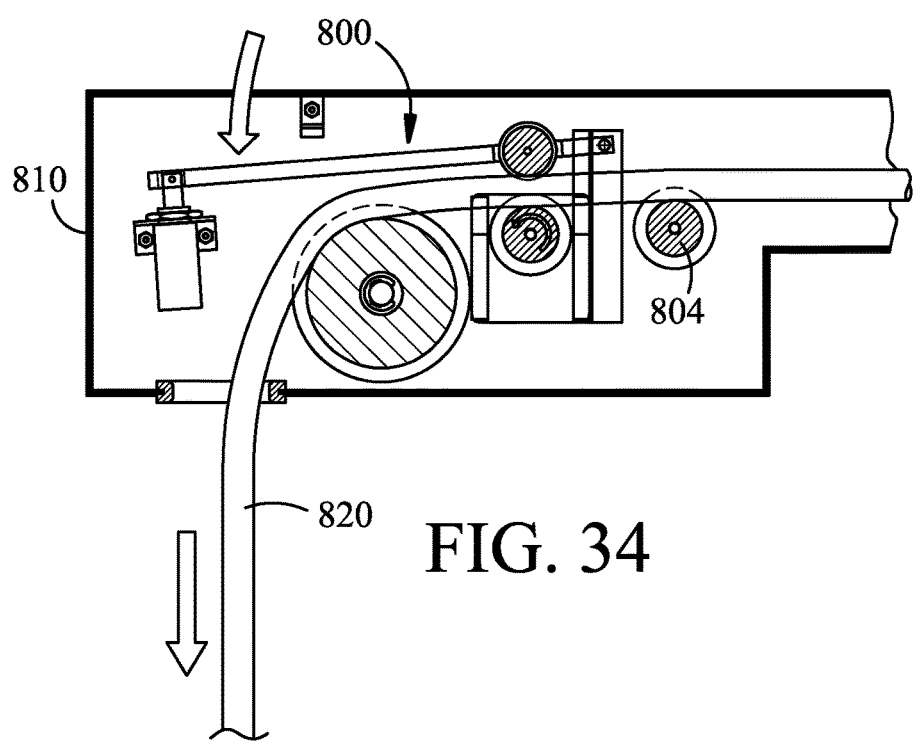
FIG. 34 is a fragmentary diagrammatic sectional view of the cable retracting mechanism of FIG. 33 with the mechanism being illustrated as the power cable is driven toward an extended position.

The drive mechanism 800 illustrated in FIGS. 33 and 34, is similar in form and function to drive mechanism 700. Drive mechanism 800 does not employ a weight trolley as such, since it is configured for an overhead cable 820, which upon retraction, is substantially completely disposed in an overhead housing 810. Because the cable 820 within the housing 810 assumes a more linear configuration than cable 720 for the stanchion installations of FIGS. 30A-32B, a smaller diameter idler 804 is employed. A spring-assist pulley is mounted to reel in the pulley as it is retracted and allow the cable 820 to be extended.

Figure 35:
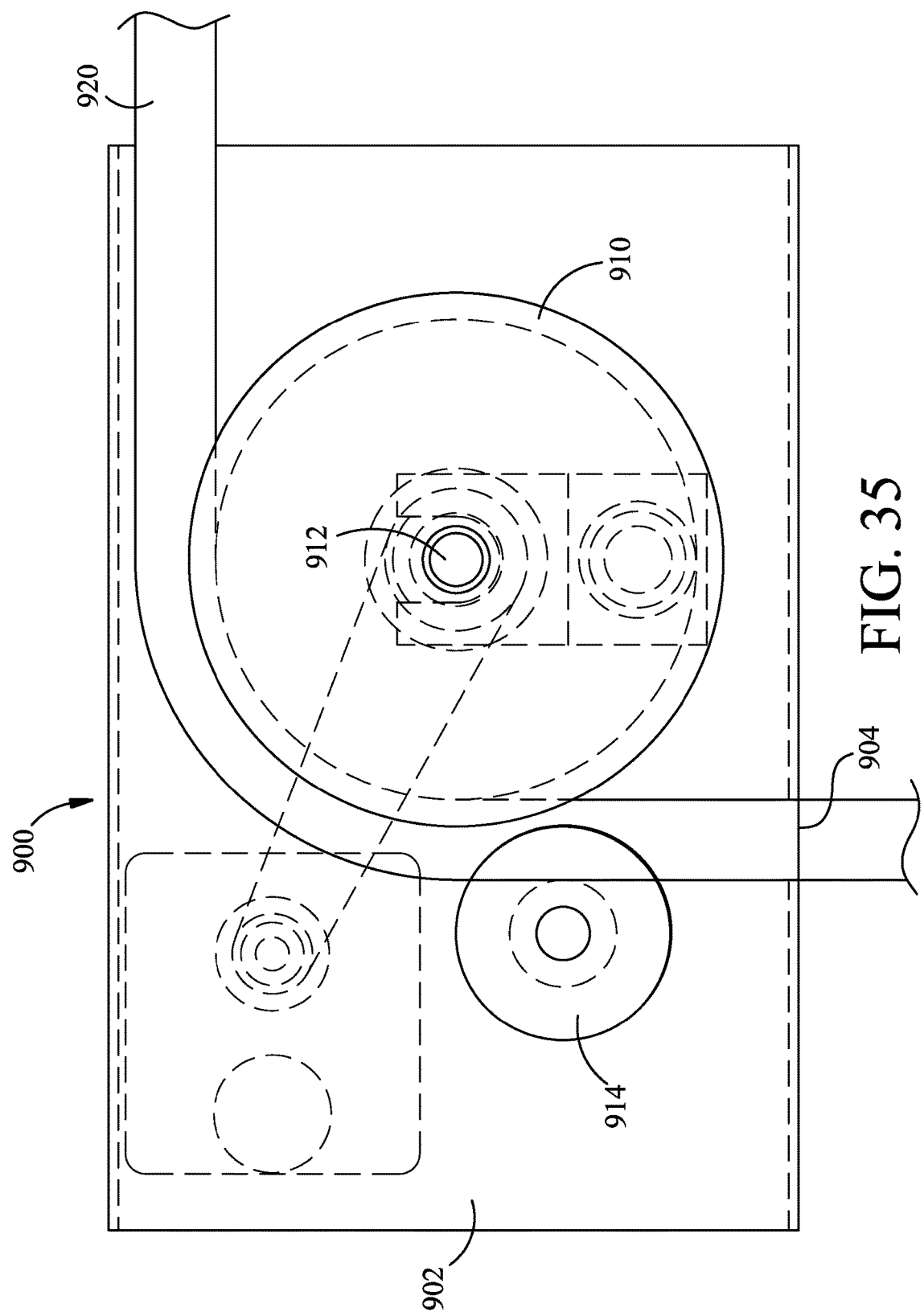
FIG. 35 is a front elevational view, partly in phantom, of another embodiment of a retractor mechanism for an overhead power cable which is partially illustrated.
Figure 36B:
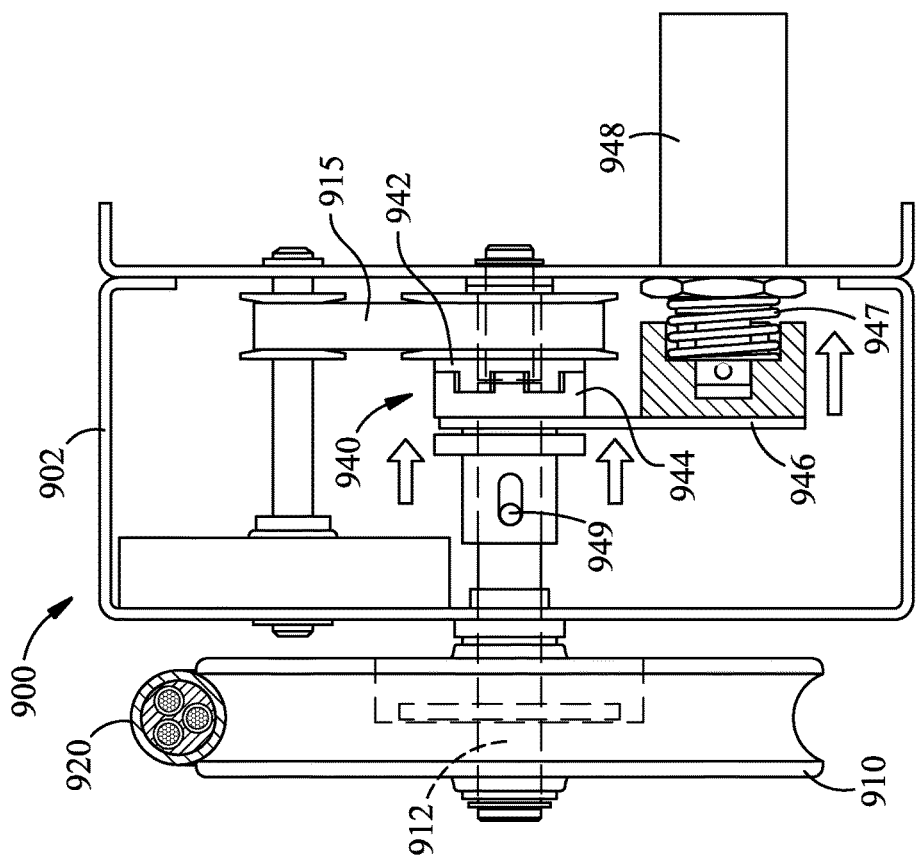
FIG. 36B is a cross-sectional view, partly in phantom and partly in diagram form, of the retractor mechanism of FIG. 35 and a portion of a power cable, illustrated in a retracting/extending mode.
Figure 36A:
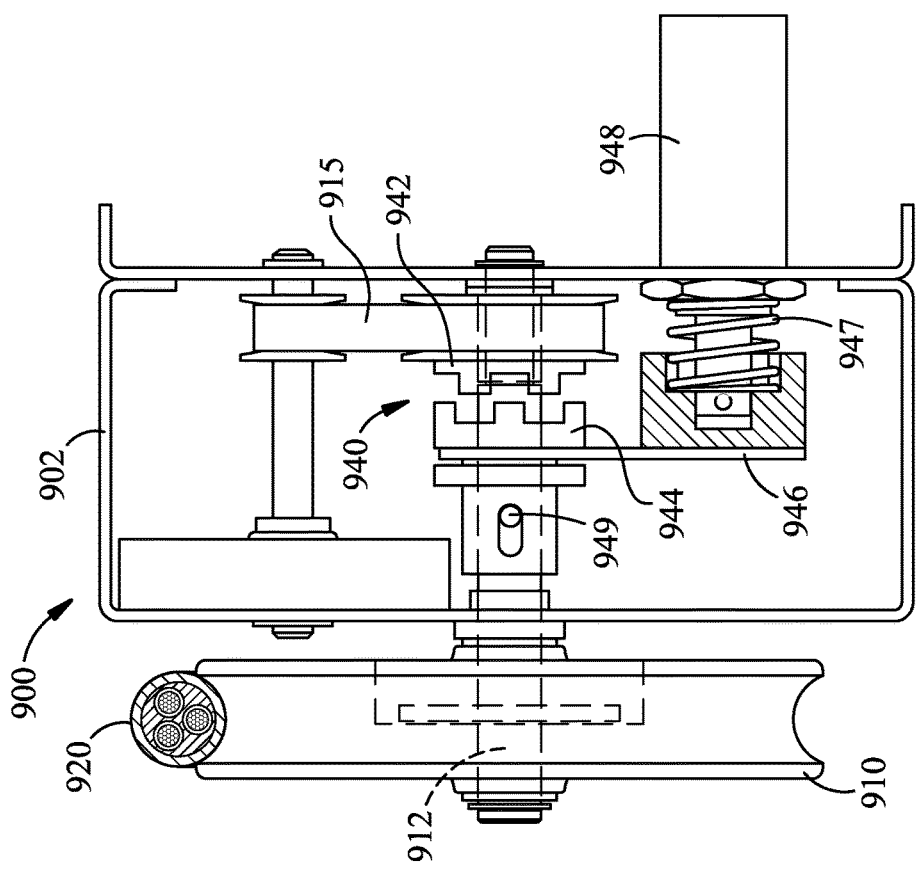
FIG. 36A is a cross-sectional view, partly in phantom, of the retractor mechanism of FIG. 35 and a portion of a power cable, illustrated in a release mode.
Figure 36C:
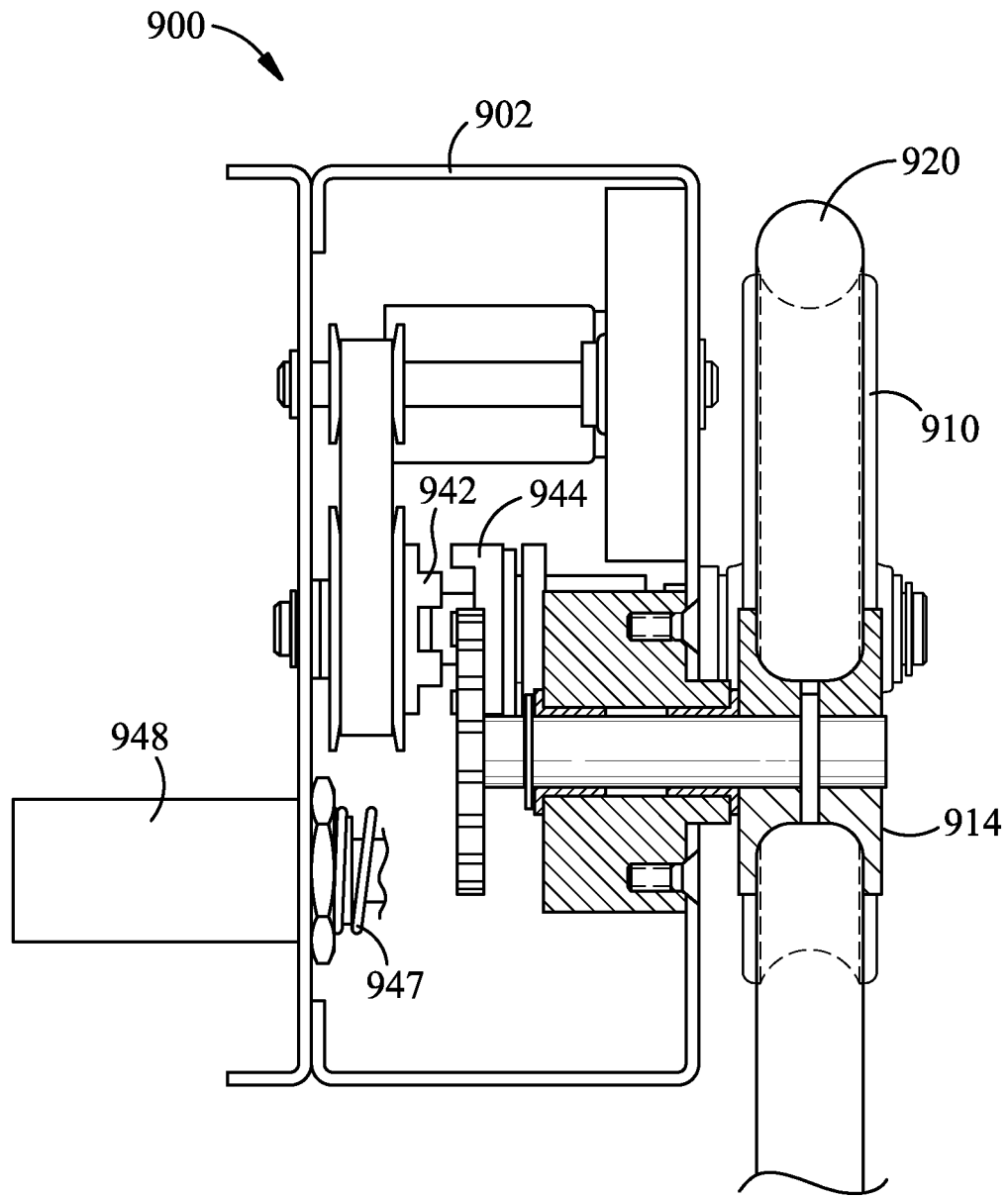
FIG. 36C is a cross-sectional view, viewed from an opposite end thereof to that of FIG. 36A of the retractor mechanism of FIG. 35 and a portion of a power cable.
Figure 37:
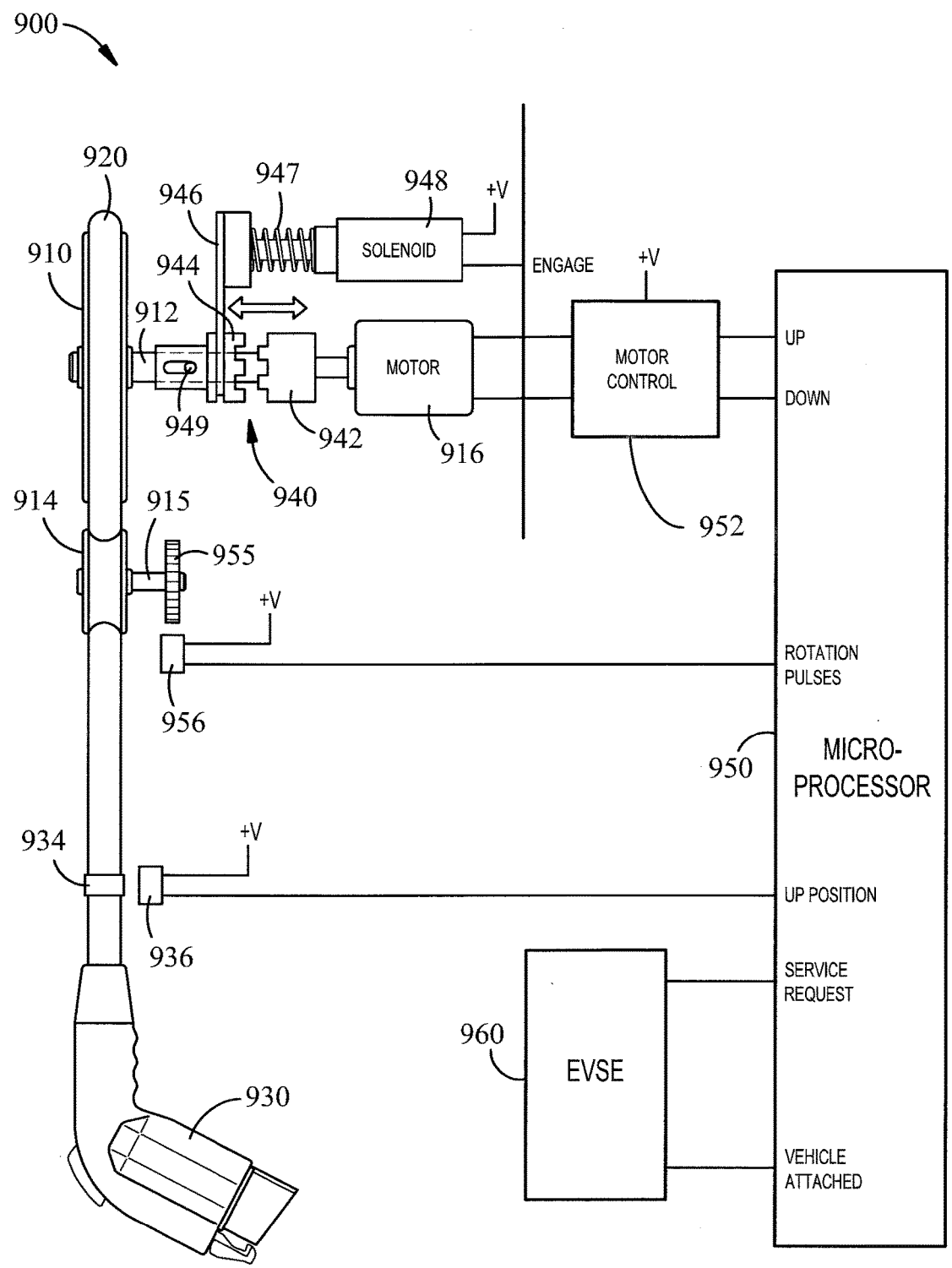
FIG. 37 is a frontal view, partly in schematic and portions removed, of the retractor mechanism and power cable of FIG. 35 and further schematically illustrating the control, operation and construction of the retractor mechanism.

With reference to FIGS. 35-37, a retractor comprising a cable drive mechanism for controllably extending, releasing and retracting an overhead power cable for various electric vehicle charging installations is generally designated by the numeral 900. The retractor 900 is housed within a housing 902. The power cable 920 passes through an opening 904 at the bottom of the housing 902. The J1772 connector 930 is preferably received within the housing or a shroud integrated with or extending from the housing 902 when the cable is fully retracted.

The retractor 900 employs a drive wheel 910 which engages along the cable 920 and is bi-directionally rotatable to extend and/or retract the power cable as required. In addition, the drive wheel is releasable to a quasi-free wheeling state. The drive wheel 910 is mounted to a shaft 912 which is driven by a selectively controlled motor 916. The motor 916 connects via a clutch 940 to selectively power the drive wheel 910.

The power cable 920 winds around the drive wheel and extends through a gap between the drive wheel 910 and a pressure/idler wheel 914. The positioning of the drive wheel 910 and the pressure wheel 914 functions to impart sufficient opposing pressure to the captured cable so that when the shaft 912 of the drive wheel is rotatably driven by the motor 916, the cable, in turn, can be retracted or extended in accordance with the directional drive of the motor.

The clutch assembly 940 employs a pair of clutch plates 942, 944 with toothed interfaces which selectively mesh to rotatably couple. The clutch plates 942, 944 are coaxial with the drive shaft 912. The position of the second clutch plate 944 is governed by a transfer arm 946 whose axial position is controlled by a solenoid 948. A disengagement spring biases 947 the transfer arm to a disengaged position of the clutch assembly. The disengaged clutch position typically allows quasi-free rotational movement of the drive wheel so that the power cable 920 may be easily extended by the vehicle operator for connection with the vehicle. a stop pin 949 axially travels in a slot to limit the axial position of the movable clutch plate 944.

The retractor 900 is automatically controlled by a microprocessor 950. The motor 916 is controlled by a motor control 952 which receives an up/down (retract/extend) input from the microprocessor 950. The microprocessor 950 also preferably incorporates a switch for setting a pre-set limit number of rotation pulses to thereby provide a limit of the cable extension and/or detect an improper operation in the drive mechanism of the power cable. The microprocessor 950 also provides an output signal for the solenoid 948.

Figure 37A:
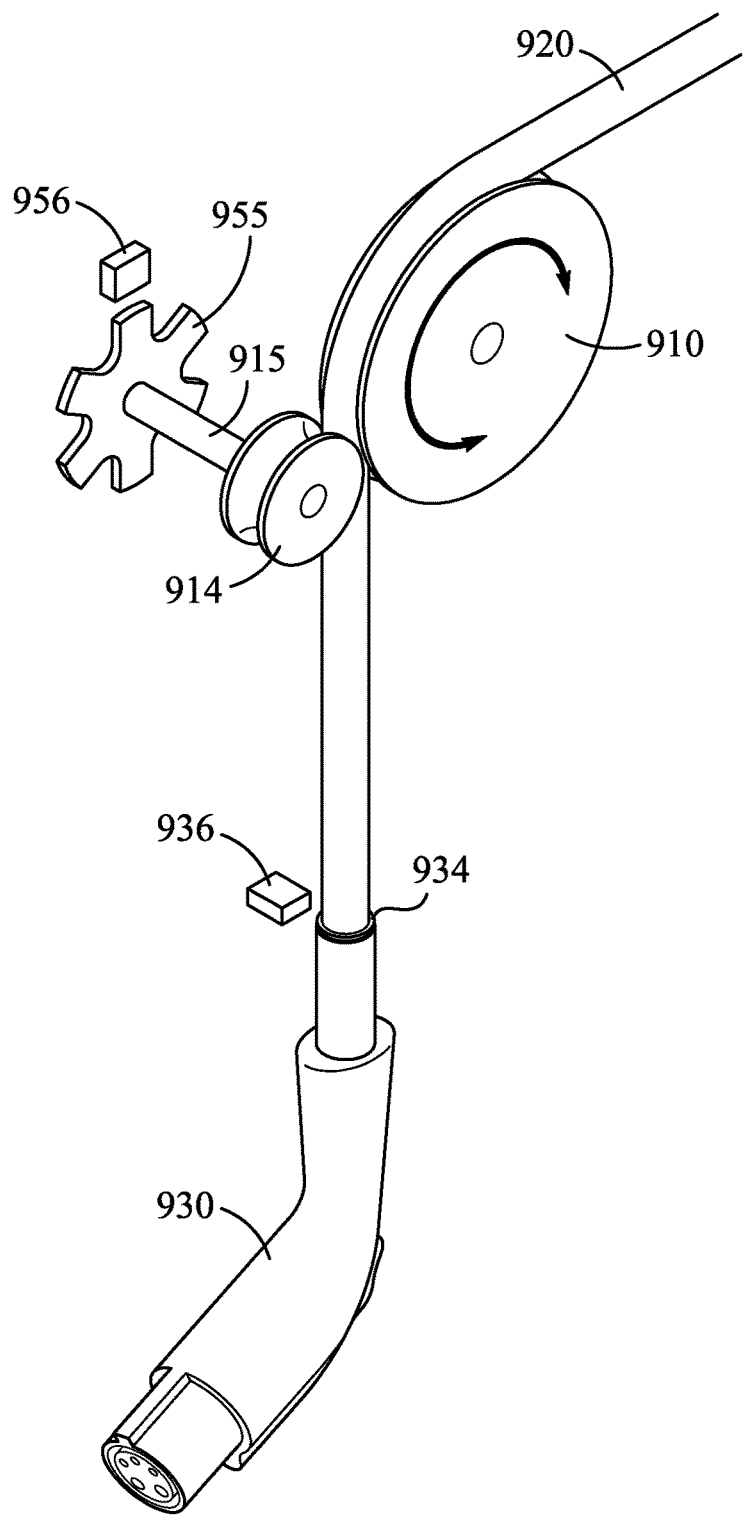
FIG. 37A is an enlarged perspective view, partly in schematic and portions removed for the retractor mechanism and power cable of FIG. 37.

With additional reference to FIG. 37A, the pressure wheel 912 rotatably fixedly connects via a shaft 915 with a magnetic gear 955. A magnetic sensor 956, such as a Hall transducer, senses the teeth as the gear rotates to provide a rotation generated pulse train input to the microprocessor 950.

In conventional fashion, the power cable includes a J1772 connector 930. A magnetic ring 934 proximate the connector is employed to electronically sense, via a magnetic sensor 936 (Hall transducer) mounted at the housing, the retracted position of the power cable 950. The microprocessor is also responsive to inputs from the EVSE 960 to electronically indicate that a service has been requested and the connector 930 has been attached to the vehicle.

When it is desired to power the drive wheel 910, for example, extend the cable 920 for usage, the solenoid 948 is energized to position the transfer arm (in the direction of the arrows) so that the clutch plates 942, 944 engage as illustrated in FIG. 36B. The motor 916 preferably drives the drive wheel shaft via a belt drive 915 which connects via the clutch 940 to the drive wheel 910. When it is desired to further extend the cable to connect the connector with the vehicle, the clutch 940 is disengaged, such as illustrated in FIG. 36A, to allow the drive wheel 910 to quasi-freely rotate.

Figure 39A:
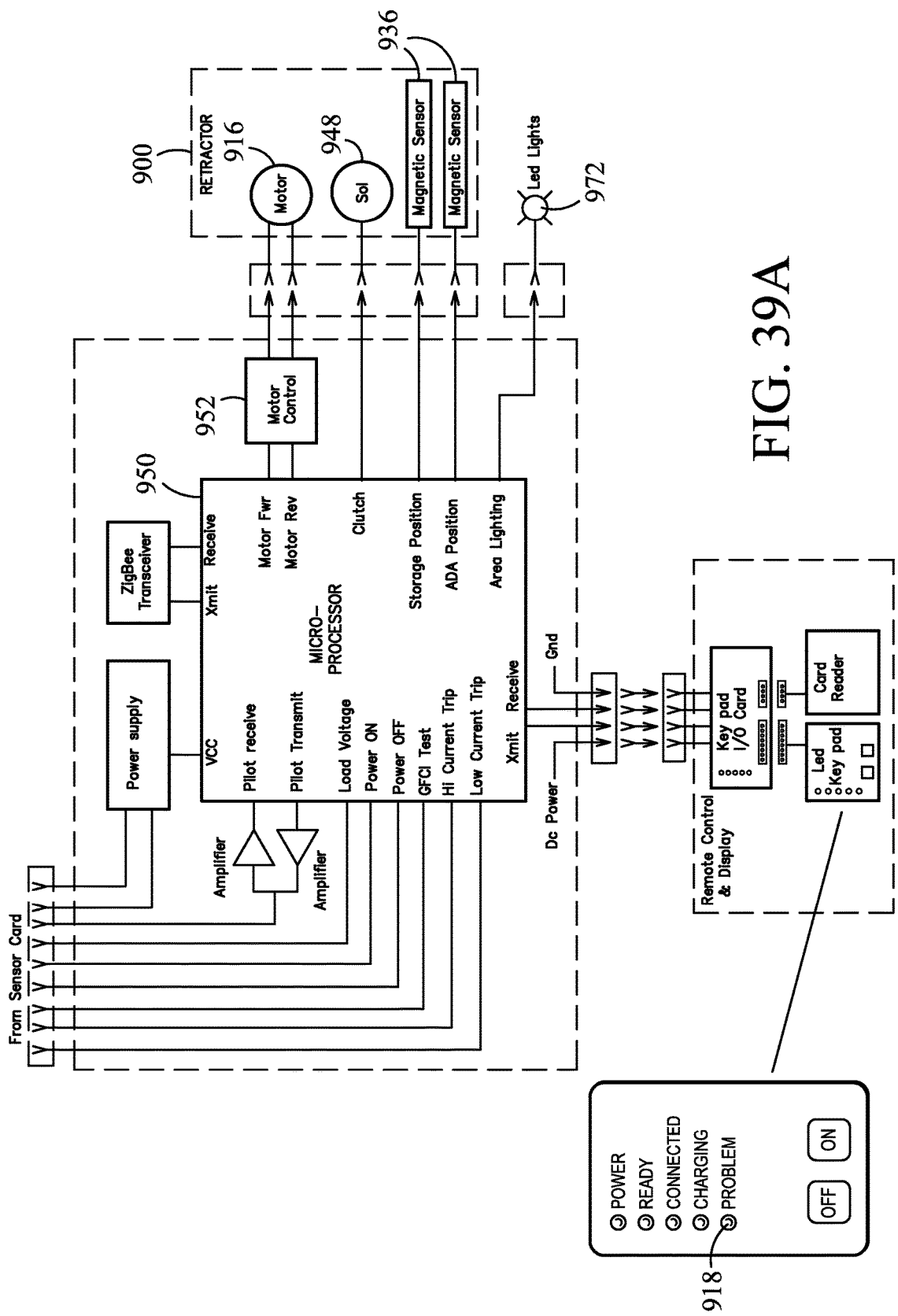
FIG. 39A is an enlarged, more detailed schematic diagram for the control module, retractor and remote control and display for the block diagram of FIG. 38.

The magnetic gear 955, which rotates with the sliding movement of the cable 920, generates pulses to electronically monitor the extension as well as the retraction. If the pulses exceed the pre-established number of pulses within a pre-established time interval, then an inoperative state is indicated at LED 918 (FIG. 39A). The inoperative state can be determined by either an excessive extension of the cable or a failure of the described drive mechanism to properly engage the cable for retraction purposes. The number of rotation pulses is also correlated with a time interval defined by a timer.

Figure 38:
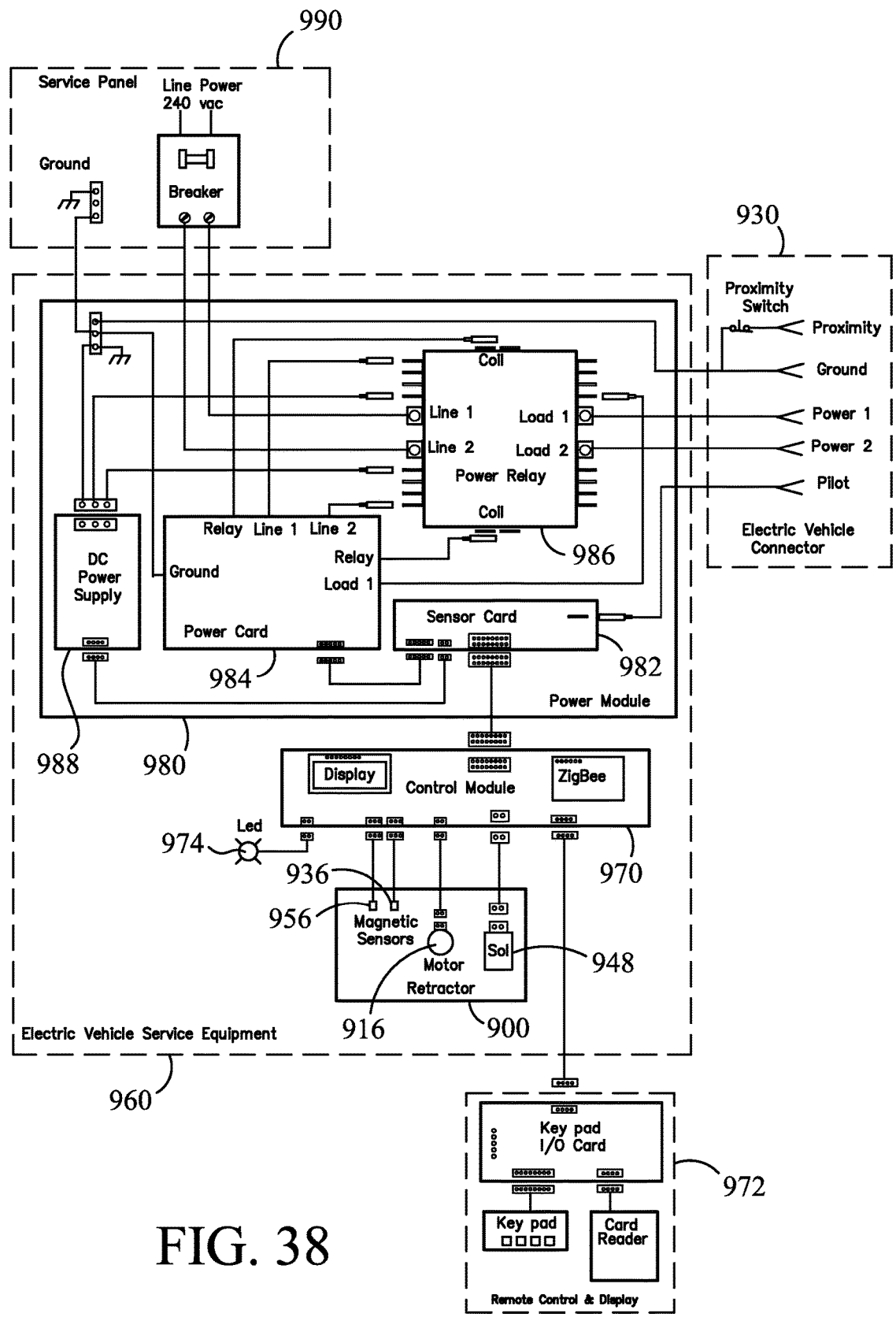
FIG. 38 is a system block diagram for the retractor mechanism of FIG. 35 as integrated into an electric vehicle charging installation.
Figure 39B:
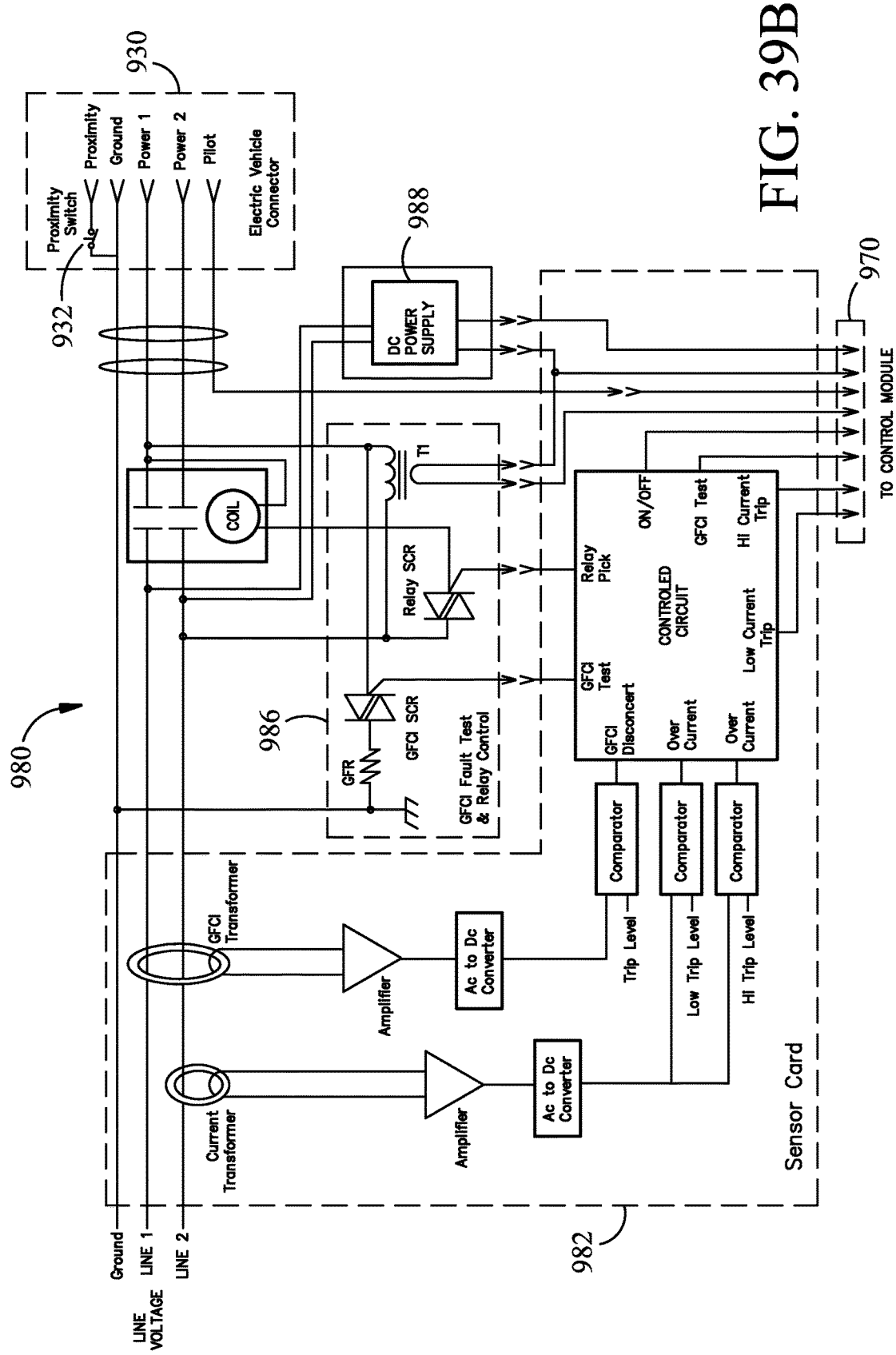
FIG. 39B is an enlarged, more detailed block diagram of the power module for the block diagram of FIG. 38.

With reference to FIGS. 38, 39A and 39B, a system block diagram illustrates how the retractor 900 can be incorporated or integrated with the EVSE system 960. The magnetic sensors 936, 956 provide inputs to a control module 970. The control module 970 receives inputs from the remote control and display 972. The control module 970 also interfaces to control the motor 916 and the solenoid 948. One or more LEDs 972 are also employed to provide general illumination.

The control module 970 interfaces with the power module 980 as best illustrated in FIG. 39B. The power module 980 generally includes a sensor card 982, a power card 984 and a power relay 986 for implementing a ground circuit control and a relay control. The power module connects with the line power service panel 990. The power module 980 includes a 24 Volt DC power supply 988 for the sensor card and the power relay 986.

The operation of the retractor mechanism can best be appreciated by the functional block diagram of FIG. 40A-40D which further describes the sequential operational sequences of the motor and the clutch as well as how improper operation can be detected and reported. The EVSE sends a service request to activate the motor to power the cable to an accessible position vertically displaced above the facility floor. The clutch 940 is engaged and a down timer starts. The rotation pulses generated by the magnetic gear coupled to the idler/pressure wheel 914 are counted. If the rotation pulses equal the preset end count, then the motor 916 is stopped and the clutch is disengaged. A start vehicle attach timer is started. The connector is attached to the vehicle. The connector 930 is attached to the vehicle.

Figure 40A:
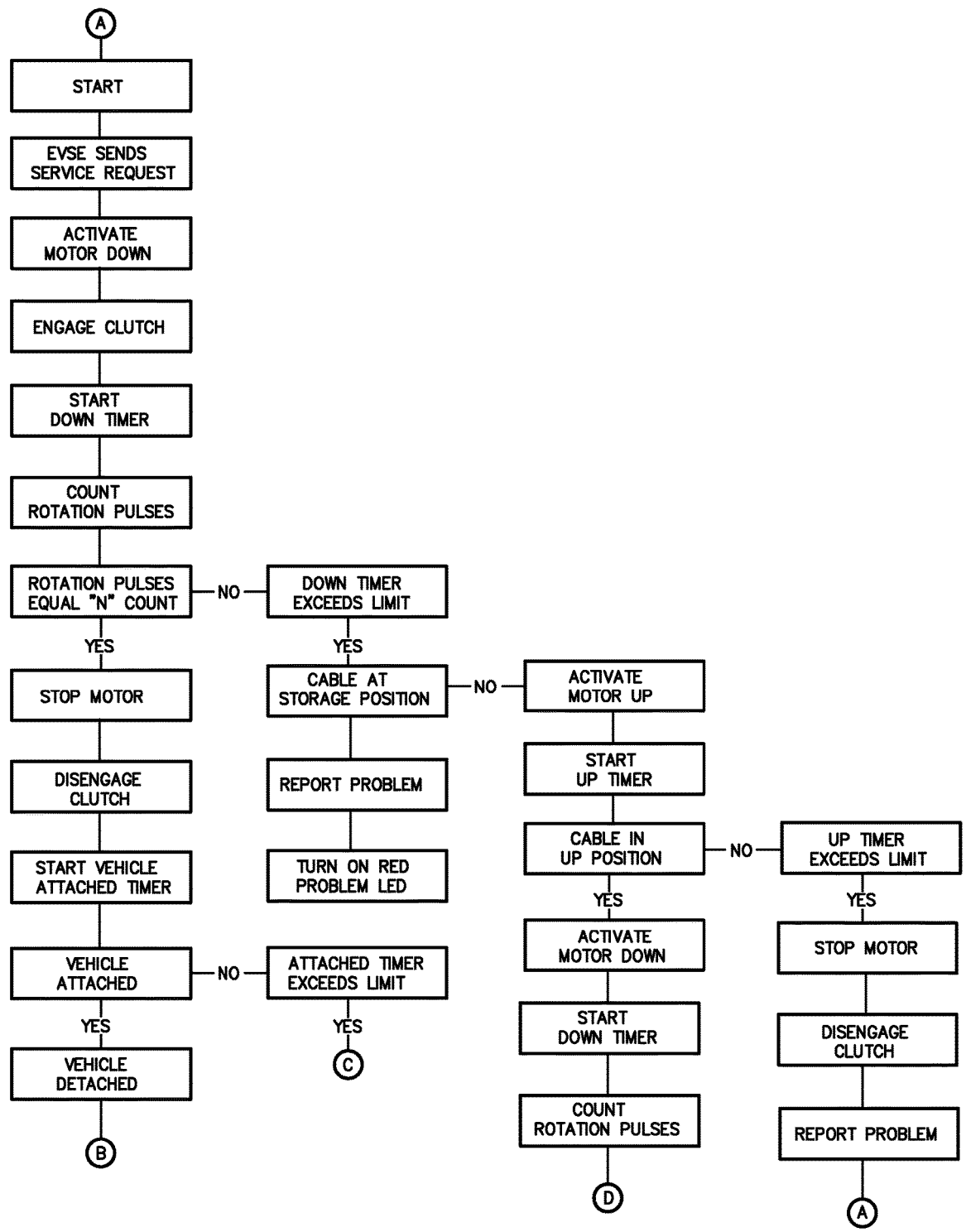
FIGS. 40A-40D together constitute a functional block diagram for the retractor mechanism of FIG. 35 as integrated with an associated EVSE system.
Figure 40B:
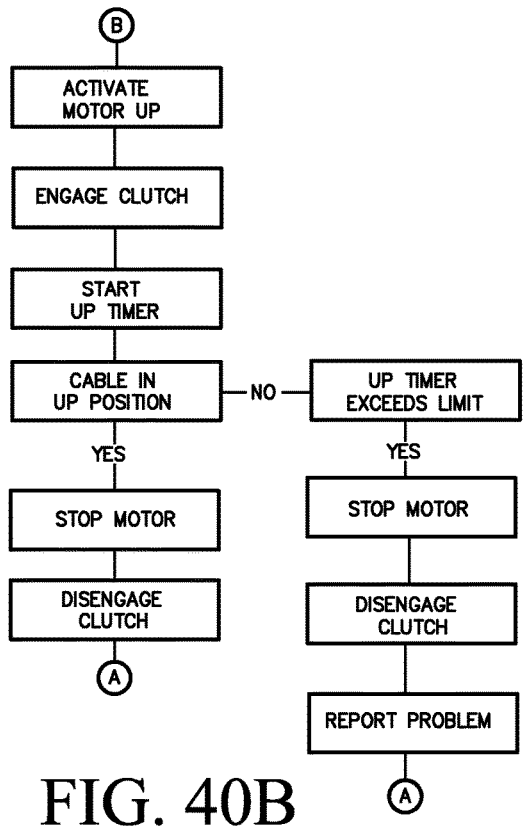
Figure 40C:
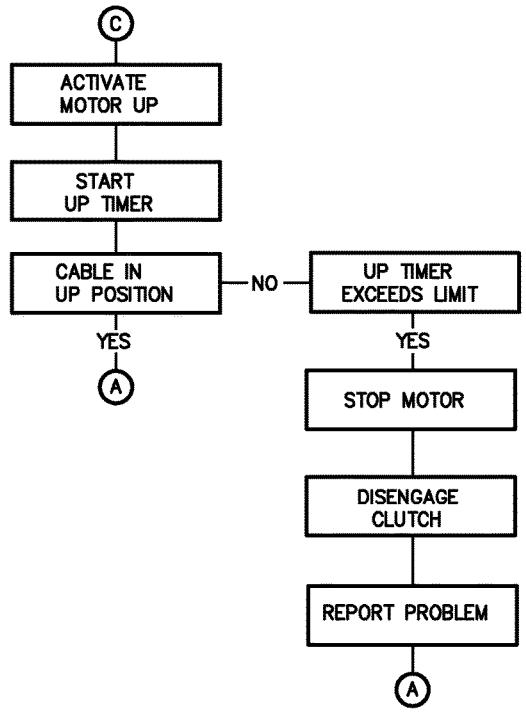
Figure 40D:
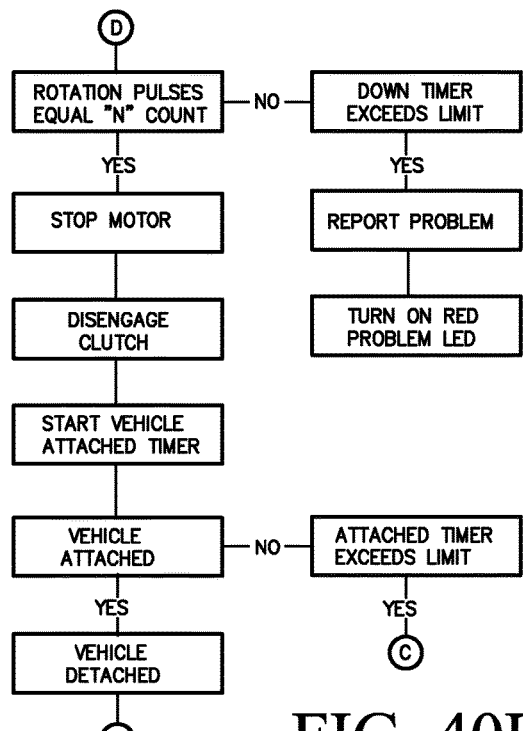

If the rotation pulses do not equal the end count and the down timer exceeds the preset limit and the cable is at a storage position as sensed by the Hall sensor, the problem is reported and the red LED trouble light 918 is activated. If the attached timer exceeds a limit, then the motor 916 is activated to drive the cable upward. A start-up timer is activated if the cable is in position and in its initial configuration A as indicated in FIG. 40A.

If the cable is not in the retracted position as sensed by the Hall sensor and the upper timer exceeds a limit, then the motor is stopped, the clutch is disengaged and a problem is indicated via LED 918 and reported.

In the event that the vehicle is detached, the motor is activated to drive the wheel so that the cable is retracted by engaging the clutch. The up timer is started when the cable retracted position is sensed by the magnetic sensor 936, the motor 916 is stopped and the clutch 940 is disengaged. Until the cable is sensed in the up position and the up timer exceeds a pre-established time, the clutch is disengaged and an operational problem is reported.

Figure 41:
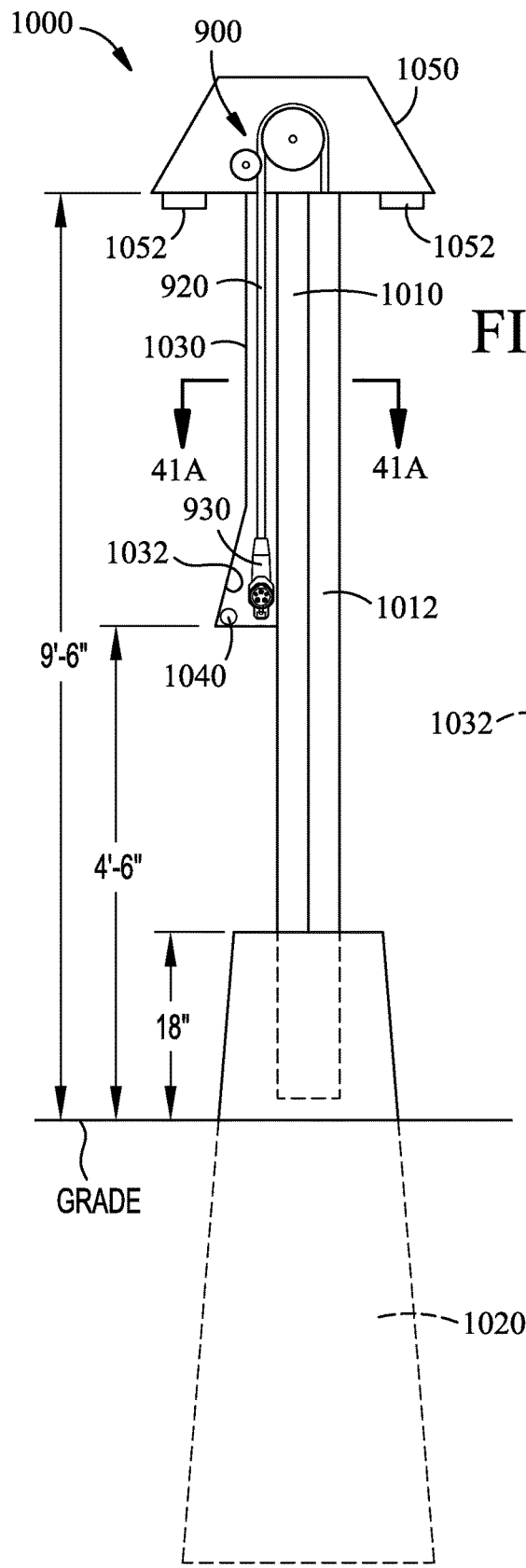
FIG. 41 is an elevated side view, partly in phantom and partly in diagram form, of a vertical post installation for an overhead retractable power cable.
Figure 41A:
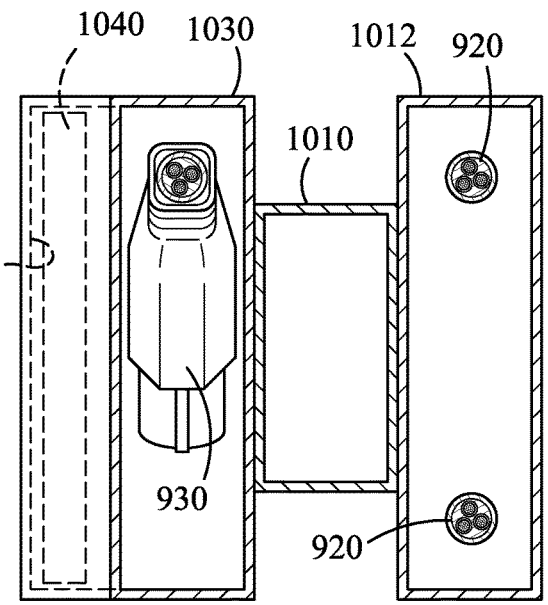
FIG. 41A is an enlarged sectional view, partly in phantom, taken along the lines A-A of the vertical post installation of FIG. 41.

With reference to FIGS. 41 and 41A, the retractor mechanism 900 may be incorporated into a charging installation 1000 which employs a post-type mount construction. A central tubular post 1010 and a tubular member 1012 are disposed in vertical side-by-side relationship and anchored in a concrete base 1020 which extends at least partially below the level of the grade. The second tubular member 1012 extends in parallel relationship to the central support post and has a slightly greater width to accommodate and the proximal portion of the variably positionable power cable 920. The opposite side of the support post includes a tubular sleeve 1030 having a dimension substantially similar to that of member 1012 except that it extends downwardly from the upper portion and terminates at an intermediate location such as, for example, at approximately 4 feet, 6 inches. The lower portion of the sleeve is open and flares outwardly to form a receptacle 1032 for the connector 930 so that when the connector is in a fully retracted position, it is fully housed within the receptacle 1032, as illustrated in FIG. 41. A roller 1040 may be mounted at the interior of the receptacle to facilitate the extension of and protect the cable from abrasion when extending the cable to connect the connector 930 to the electric vehicle.

The upper portion of the retractor mechanism 900 is housed within a cap-like enclosure 1050 which has a bottom panel that seals with the sleeve 1030, 1010, post and member 1012 to protect the housed retractor 900 from the elements. Illumination lights 1052 are preferably disposed at the bottom of the enclosure to provide illumination for the installation.

As further illustrated in FIGS. 42A-42C, the retractor mechanism 900 can be employed in a wide variety of overhead cable installations. In FIG. 42A for an overhead cable installation such as one suspended from the ceiling of a garage, the end of the cable connects via a trolley 992 with a spring return mechanism 994. In the installation illustrated in FIG. 42, for a stanchion as previously described, a roller/counterweight assembly 996 may be employed. FIG. 42C illustrates a vertically supported overhead connector, the position of which is controlled by the retractor 900 and which employs a counterbalancing weight trolley 998 on the end of the cable.

While preferred embodiments of the invention have been set forth for purposes of illustration, the foregoing should not be deemed a limitation of the invention herein. Accordingly, various modifications, adaptations and alternatives may occur to one skilled in the art without departing from the spirit and the scope of the present invention.

What is claimed:

1. A system for charging an electric vehicle comprising:
    a rail disposed at a height above a vehicle to be charged;
    a trolley movable along said rail and mounting a movable pulley;
    a fixed pulley mounted at a fixed position relative to said rail;
    a control module fixed relative to said rail and having a power source connected thereto;
    a power cable attached at one end to said control module and communicating with the power source and having an opposed second end communicating with a vehicle terminal connector, said cable looped around said movable and fixed pulleys so that said connector is suspended below said rail; and
    a spring return device connected with said movable pulley to urge said pulley to a retracted position.

2. The system of claim 1 further comprising a pull cord attached to said cable.

3. The system of claim 1 further comprising a point of sale module (POS module) carried by said cable and disposed adjacent said connector.

4. The system of claim 3 wherein said POS module is connected to break away from said connector.

5. The system of claim 3 wherein said POS module has a reader.

6. The system of claim 3 wherein said connector is a level 2 vehicle outlet connector and said POS module has a level 1 vehicle outlet connector.

7. The system of claim 3 wherein said POS module further comprises a plurality of switches for selectively implementing a selection from a plurality of power charge parameters.

8. The system of claim 1 further comprising a vehicle detector.

9. The system of claim 1 further comprising a transceiver for communicating data indicative of the power charge to an interface unit.

\* \* \* \* \*